United States Patent
Paschou et al.

(10) Patent No.: US 11,926,284 B2
(45) Date of Patent: Mar. 12, 2024

(54) PREVENTING REPLAY/RELAY ATTACKS IN KEYLESS ENTRY SYSTEMS

(71) Applicant: Kabushiki Kaisha Toshiba, Tokyo (JP)

(72) Inventors: Chrysanthi Paschou, Bristol (GB); Ziming Zhu, Bristol (GB); Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 111 days.

(21) Appl. No.: 17/749,680

(22) Filed: May 20, 2022

(65) Prior Publication Data

US 2023/0373436 A1 Nov. 23, 2023

(51) Int. Cl.
  *B60R 25/24* (2013.01)
  *B60R 25/102* (2013.01)
  *G07C 9/00* (2020.01)
  *H04B 17/318* (2015.01)
  *H04L 9/00* (2022.01)

(52) U.S. Cl.
  CPC ........ *B60R 25/1025* (2013.01); *B60R 25/245* (2013.01); *G07C 9/00309* (2013.01); *H04B 17/318* (2015.01); *H04L 9/50* (2022.05); *G07C 2009/00412* (2013.01); *G07C 2009/00555* (2013.01); *G07C 2009/00769* (2013.01); *G07C 2209/08* (2013.01); *G07C 2209/64* (2013.01); *H04L 2209/84* (2013.01)

(58) Field of Classification Search
  None
  See application file for complete search history.

(56) References Cited

U.S. PATENT DOCUMENTS

| | | |
|---|---|---|
| 10,391,975 B2 | 8/2019 | Meng |
| 10,513,244 B2 | 12/2019 | Murakami et al. |
| 11,399,287 B2 * | 7/2022 | Soryal ..................... H04W 4/40 |

OTHER PUBLICATIONS

Alex Varshavsky, et al., "Amigo: Proximity-Based Authentication of Mobile Devices," 9th International Conference, UbiComp 2007: Ubiquitous Computing, 2007, 35 pages.

(Continued)

*Primary Examiner* — K. Wong
(74) *Attorney, Agent, or Firm* — Oblon, McClelland, Maier & Neustadt, L.L.P.

(57) ABSTRACT

A method for controlling access to a resource, the method performed by a system comprising a first component, a second component and a third component, the first component comprising a first cryptographic key; the second component comprising a second cryptographic key. The method comprising: transmitting a signal; generating, by the first component a first channel observation; generating, by the second component, a second channel observation, and a first data value based on the second channel observation and the second cryptographic key; transmitting, by the second component, the second channel observation and the first data value; and verifying the second component based on the second channel observation, the first cryptographic key and the first data value; and allowing access to the resource in response to determining that the second component is: 1) permitted to gain access to the resource; and 2) located proximate to the first component.

20 Claims, 15 Drawing Sheets

(56) References Cited

OTHER PUBLICATIONS

Flavio D. Garcia, et al. "Lock It and Still Lose It—On the (In)Security of Automotive Remote Keyless Entry Systems," Proceedings of the 25th USENIX Security Symposium, Aug. 2016, 17 pages.
Iyemeh Uchendu et al., "Survey of Beam Steering Techniques Available for Millimeter Wave Applications," Progress In Electromagnetics Research B, vol. 68, 2016 pp. 35-54.
Selim Aki, "Digital Signatures: A Tutorial Survey," Computer, Feb. 1983, pp. 15-24.

* cited by examiner

PREVENTING REPLAY/RELAY ATTACKS IN KEYLESS ENTRY SYSTEMS

FIELD

Embodiments described herein relate to a method and a system for controlling access to a resource.

BACKGROUND

Over the past few years vehicle manufacturers have started to produce vehicles, which use remote key entry. Remote key entry systems typically comprise a control unit located within a vehicle and a number of remote keys, which are authorized to unlock vehicle access, provided these keys are within a range of the control unit. In practice, the mechanism of unlocking vehicle access also comprises the exchange of authorization messages by a short-range communication link.

While the ability to remotely unlock a vehicle has enabled unrivalled convenience for an authorized party, it has also created a number of security vulnerabilities, which could be exploited by an unauthorized party.

One way for an unauthorized party to gain access to a vehicle employing a remote key entry system is to use a relay attack. Relay attacks typically involves two radio transceivers, which, in essence, extend the distance from the vehicle which the remote key of an authorized user can unlock vehicle access and/or functionality. By employing a relay attack in this way an unauthorized party is able to gain access to a user's vehicle.

Another way for an unauthorized party to gain access to a user's vehicle is to employ is a replay attack. In a replay attack an attacker overhears a legitimate communication exchange between a legitimate key fob and a verifier component and repeats the transmissions of the key fob at a later time (e.g. when the valid user of the key fob is not present), thereby tricking the verifier component into thinking a legitimate key fob is present.

One approach to prevent relay attacks is known as Distance Bounding (DB). In Distance Bounding (DB) techniques a highly accurate timing device to measure the time of flight for various communication exchanges. From this information, a distance to the legitimate key fob is determined. Distance Bounding (DB) techniques can be hard to implement and often require high specification hardware and Ultra-Wide Bandwidth (UWB) channels.

In light of this a new approach to remote key entry is desired which prevents unauthorized users from accessing a resource while still being easy and convenient for the user to use.

Arrangements of embodiments will be understood and appreciated more fully from the following detailed description, made by way of example only and taken in conjunction with drawings in which.

In the figures, same reference numerals denote same components.

DETAILED DESCRIPTION

Figure 1A:
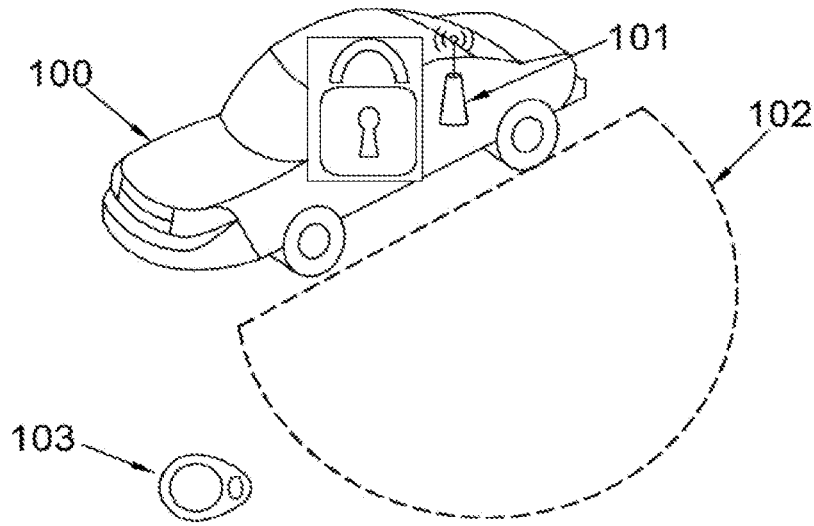
FIG. 1A shows a known remote key entry system in a locked state.

According to a first aspect there is provided a method for controlling access to a resource, the method performed by a system comprising a first component, a second component and a third component, wherein: the first component comprises a first cryptographic key; the second component comprises a second cryptographic key. The method comprising: transmitting, by the third component, a signal; generating, by the first component, a first channel observation; generating, by the second component, a second channel observation; generating, by the second component, a first data value based on the second channel observation and the second cryptographic key; and transmitting, by the second component, to the first component, the second channel observation and the first data value. The method further comprises: verifying the second component, by the first component, based on the second channel observation, the first cryptographic key and the first data value; and allowing access to the resource in response to determining that the second component is: 1) permitted to gain access to the resource; and 2) located proximate to the first component.

In an embodiment, allowing access to the resource includes unlocking access/functionality of a car.

In an embodiment, a channel observation is a representation of the signal observed via an antenna of the second/third component.

In an embodiment, the first data value is a hash.

In an embodiment located proximate means located at a distance such that the first component and the second component make similar channel observations.

In an embodiment the signal has a first wavelength and wherein proximate includes within a distance less than or equal to ½ of the first wavelength.

In an embodiment the first component, the second component and the third component communicate wirelessly with each other.

In an embodiment, the first component is configured to cause access to the resource to be allowed/permitted.

In an embodiment, the system is a remote key-less entry system.

In an embodiment the first component, the second component and the third component are physically separate components.

In an embodiment the first component is a first transceiver, the second component is a second transceiver and the third component is a first transmitter.

In an embodiment generating, by the first component, the first channel observation comprises: determining a received signal strength indicator of a received signal, sampling the received signal strength indicator to generate a sampled signal; and quantizing the sampled signal to generate the first channel observation.

In an embodiment, quantizing the sampled signal uses a 1 bit quantization (i.e. 0 or 1) by comparing the sampled signal to a threshold.

In an embodiment generating the first data value based on the second channel observation and the second cryptographic key comprises: applying the second channel observation as an input to a keyed hash function, wherein the keyed hash function uses the second cryptographic key.

In an embodiment the method further comprises: transmitting, by the first component, to the second component, a random number; and wherein: generating, by the second component, the first data value based on the second channel observation and the second cryptographic key, further comprises: generating the first data value based on the second channel observation, the second cryptographic key, and the random number; and wherein: verifying the second component, by the first component, based on the second channel observation, the first cryptographic key and the first data value, further comprises: generating a second data value based on the second channel observation, the random number and the first cryptographic key; and determining that the second component is permitted to gain access to the resource in response to determining that the first data value is the same as the second data value.

In an embodiment, the random number is a nonce.

In an embodiment, generating the first data comprises applying an input to a keyed hash function, wherein the keyed hash function uses the second cryptographic key and the input comprises the second channel observation and the random number.

In an embodiment, the second channel observation is concatenated with the random number to form the input.

In an embodiment, the hash function is an MD-5 hash function.

In an embodiment the method further comprises starting a timer at the first component in response to transmitting the random number; stopping the timer at the first component in response to receiving the second channel observation and the first data value from the second component; and allowing access to the resource in response to determining that: a value of the timer is less than a threshold; and the second component is: 1) permitted to gain access to the resource; and 2) located proximate to the first component.

In an embodiment verifying the second component by the first component comprises: comparing the first channel observation and the second channel observation; and determining that the second component is located proximate to the first component in response to determining that the first channel observation is similar to the second channel observation.

In an embodiment comparing the first channel observation and the second channel observation comprises determining a number of bit positions in the first channel observation that have a different value to the respective bit position in the second channel observation; and determining that the second component is located proximate to the first component in response to determining that the number of bit positions is less than a threshold.

In an embodiment, comparing the first channel observation and the second channel observation comprises calculating a hamming distance between the first and second channel observation and determining that the first channel observation is similar to the second channel observation in response to the hamming distance being less than a threshold.

In an embodiment, comparing the first channel observation and the second channel observation comprises calculating a Pearson correlation between the first channel observation and the second channel observation and determining that the first channel observation is similar to the second channel observation in response to determining that the Pearson correlation is greater than a threshold.

In an embodiment the method further comprising removing a first bit at the start of the first channel observation and the second channel observation; and/or removing a last bit at the end of the first channel observation and the second channel observation before comparing the first channel observation and the second channel observation.

In an embodiment, the method further comprises: transmitting, by the third component, the signal in a first direction; and transmitting, by the third component, the signal in a second direction.

In an embodiment there is a predetermined delay between transmitting the signal in the first direction and transmitting the signal in the second direction;

In an embodiment the first direction and the second direction are selected randomly;

In an embodiment, the first component comprises an antenna and a beam steering component configured to change the direction of the antennas radiation pattern and wherein the method further comprises: beam steering, by the beam steering component, the antenna radiation pattern to the second direction after transmitting the signal in the first direction.

In an embodiment, the antenna has two main lobes.

In an embodiment the method further comprises: initializing, by the first component, an access attempt counter; and in response to determining that the second component is: 1) not permitted to gain access to the resource and/or 2) not located proximate to the first component: preventing access to the resource; incrementing the access attempt counter; and disabling remote access to the resource in response to determining that the access attempt counter is greater than a threshold.

In an embodiment the method further comprises resetting the access attempt count in response to determining that the second component is: 1) permitted to gain access to the resource and 2) located proximate to the first component.

In an embodiment, disabling remote access includes preventing access to the resource using the second component.

In an embodiment, the first channel observation and the second channel observation are each 128 bits in length.

In an embodiment, the resource is a car and the method is for controlling access to the car; or the resource is a building and the method is for controlling access to the building.

In an embodiment, the method further comprises transmitting the signal at a frequency of 900 MHz or 2.4 GHz.

According to a second aspect there is provided system for controlling access to a resource, the system comprising a first component, a second component and a third component, wherein: the first component comprises a first cryptographic key; the second component comprises a second cryptographic key; and wherein: the third component is configured to: transmit a signal; the second component is configured to: generate a second channel observation; generate a first data value based on the second channel observation and the second cryptographic key; and transmit to the first component, the second channel observation and the first data value. In the system the first component is configured to: generate a first channel observation; verify the second component based on the second channel observation, the first cryptographic key and the first data value; and allow access to the resource in response to determining that the second component is: 1) permitted to gain access to the resource; and 2) located proximate to the first component.

In an embodiment, the first component is further configured, when generating the first channel observation, to: determine a received signal strength indicator of a received signal, sample the received signal strength indicator to generate a sampled signal; and quantize the sampled signal to generate the first channel observation.

In an embodiment, the second component is further configured, when generating the first data value based on the second channel observation and the second cryptographic key, to: apply the second channel observation as an input to a keyed hash function, wherein the keyed hash function uses the second cryptographic key.

In an embodiment the second component is further configured, when generating the first data value based on the second channel observation and the second cryptographic key, to: generate the first data value based on the second channel observation, the second cryptographic key, and a random number; and wherein: the first component is further configured to: transmit the random number to the second component and generate a second data value based on the second channel observation, the random number and the first cryptographic key; and determine that the second component is permitted to gain access to the resource in response to determining that the first data value is the same as the second data value.

In an embodiment the first component is further configured to: start a timer in response to transmitting the random number; stop the timer in response to receiving the second channel observation and the first data value from the second component; and allow access to the resource in response to determining that: a value of the timer is less than a threshold; and the second component is: 1) permitted to gain access to the resource; and 2) located proximate to the first component.

In an embodiment the first component is further configured, when verifying the second component, to: compare the first channel observation and the second channel observation; and determine that the second component is located proximate to the first component in response to determining that the first channel observation is similar to the second channel observation.

In an embodiment, the third component is further configured to: transmit the signal in a first direction; and transmit the signal in a second direction.

In an embodiment the first component is further configured to: initialize an access attempt counter; and in response to determining that the second component is: 1) not permitted to gain access to the resource and/or 2) not located proximate to the first component; prevent access to the resource; increment the access attempt counter; and disable remote access to the resource in response to determining that the access attempt counter is greater than a threshold.

In an embodiment, the first channel observation and the second channel observation are each 128 bits in length.

In an embodiment, the resource is a car and the system is for controlling access to the car; or the resource is a building and the system is for controlling access to the building.

In an embodiment, the first component is configured to transmit the signal at a frequency of 900 MHz or 2.4 GHz.

According to a third aspect there is provided a method comprising: generating a first channel observation; receiving, a second channel observation and a first data value from a second component; verifying the second component based on the second channel observation, the first cryptographic key and the first data value; and allowing access to the resource in response to determining that the second component is: 1) permitted to gain access to the resource; and 2) located proximate to the first component.

In an embodiment generating the first channel observation comprises: determining a received signal strength indicator of a received signal, sampling the received signal strength indicator to generate a sampled signal; and quantizing the sampled signal to generate the first channel observation.

In an embodiment the method further comprises: transmitting to the second component, a random number; and wherein: verifying the second component based on the second channel observation, the first cryptographic key and the first data value, further comprises: generating a second data value based on the second channel observation, the random number and the first cryptographic key; and determining that the second component is permitted to gain access to the resource in response to determining that the first data value is the same as the second data value.

In an embodiment the method further comprises starting a timer in response to transmitting the random number; stopping the timer in response to receiving the second channel observation and the first data value from the second component; and allowing access to the resource in response to determining that: a value of the timer is less than a threshold; and the second component is: 1) permitted to gain access to the resource; and 2) located proximate to the first component.

In an embodiment verifying the second component comprises: comparing the first channel observation and the second channel observation; and determining that the second component is located proximate to the first component in response to determining that the first channel observation is similar to the second channel observation.

In an embodiment the method further comprises: initializing an access attempt counter; and in response to determining that the second component is: 1) not permitted to gain access to the resource and/or 2) not located proximate to the first component: preventing access to the resource; incrementing the access attempt counter; and disabling remote access to the resource in response to determining that the access attempt counter is greater than a threshold.

According to a fourth aspect there is provided a non-transitory computer-readable medium comprising computer program instructions suitable for execution by a processor, the instructions configured, when executed by the processor, to perform the methods described above.

According to a fifth aspect there is provided a device comprising a first cryptographic key, the device configured to: the first component is configured to: generate a first channel observation; receive, a second channel observation and a first data value from a second component; verify the second component based on the second channel observation, the first cryptographic key and the first data value; and allow access to the resource in response to determining that the second component is: 1) permitted to gain access to the resource; and 2) located proximate to the first component.

In an embodiment, the device is further configured, when generating the first channel observation, to: determine a received signal strength indicator of a received signal, sample the received signal strength indicator to generate a sampled signal; and quantize the sampled signal to generate the first channel observation.

In an embodiment the device is further configured to: transmit a random number to the second component and generate a second data value based on the second channel observation, the random number and the first cryptographic key; and determine that the second component is permitted to gain access to the resource in response to determining that the first data value is the same as the second data value.

In an embodiment the device is further configured to: start a timer in response to transmitting the random number; stop the timer in response to receiving the second channel observation and the first data value from the second component; and allow access to the resource in response to determining that: a value of the timer is less than a threshold; and the second component is: 1) permitted to gain access to the resource; and 2) located proximate to the first component.

In an embodiment the device is further configured, when verifying the second component, to: compare the first channel observation and the second channel observation; and determine that the second component is located proximate to the first component in response to determining that the first channel observation is similar to the second channel observation.

In an embodiment the device is further configured to: initialize an access attempt counter; and in response to determining that the second component is: 1) not permitted to gain access to the resource and/or 2) not located proximate to the first component: prevent access to the resource; increment the access attempt counter; and disable remote access to the resource in response to determining that the access attempt counter is greater than a threshold.

According to a sixth aspect there is provided a method comprising generating a second channel observation; generating a first data value based on the second channel observation and a second cryptographic key; and transmitting, to the first component, the second channel observation and the first data value.

In an embodiment generating the first data value based on the second channel observation and the second cryptographic key comprises: applying the second channel observation as an input to a keyed hash function, wherein the keyed hash function uses the second cryptographic key.

In an embodiment the method further comprises: receiving a random number and wherein: generating, by the second component, the first data value based on the second channel observation and the second cryptographic key, further comprises: generating the first data value based on the second channel observation, the second cryptographic key, and a random number.

According to a seventh aspect there is provided a non-transitory computer-readable medium comprising computer program instructions suitable for execution by a processor, the instructions configured, when executed by the processor, to perform the above methods.

According to an eighth aspect there is provided device comprising a second cryptographic key, the device configured to: generate a second channel observation; generate a first data value based on the second channel observation and the second cryptographic key; and transmit to the first component, the second channel observation and the first data value.

In an embodiment, the device is further configured, when generating the first data value based on the second channel observation and the second cryptographic key, to: apply the second channel observation as an input to a keyed hash function, wherein the keyed hash function uses the second cryptographic key.

In an embodiment the second component is further configured, to: receive a random number, and is further configured when generating the first data value based on the second channel observation and the second cryptographic key, to: generate the first data value based on the second channel observation, the second cryptographic key, and a random number.

According to a ninth aspect there is provided a method comprising transmitting a signal.

In an embodiment, the method further comprises: transmitting the signal in a first direction; and transmitting the signal in a second direction.

According to a tenth aspect there is provided a non-transitory computer-readable medium comprising computer program instructions suitable for execution by a processor, the instructions configured, when executed by the processor, to perform the above methods.

According to an eleventh aspect there is provided a device, configured to transmit a signal.

In an embodiment, the device is further configured to: transmit the signal in a first direction; and transmit the signal in a second direction.

FIG. 1A shows a known remote key entry system in a locked state. FIG. 1A shows a car 100 comprising a control unit 101. The control unit 101 is configured to transmit signals to, and receive signals from the remote key 103. If the remote key 103 is outside the transmission and reception range of the control unit 101, represented by the boundary 102, then the control unit 101 will not unlock vehicle access or functionality, irrespective of whether the remote key 103 is associated with an authorized user.

Figure 1B:
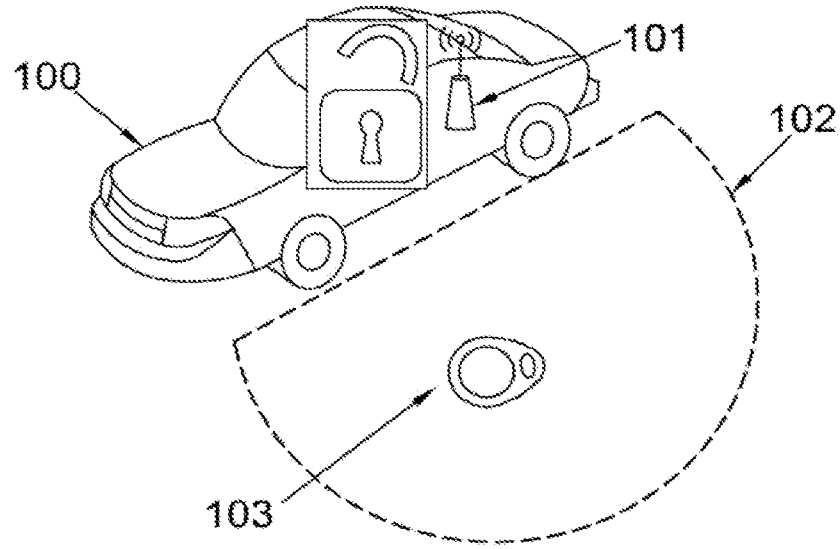
FIG. 1B shows a known remote key entry system in an unlocked state.

FIG. 1B shows a known remote key entry system in an unlocked state. FIG. 1B uses similar reference numerals as FIG. 1A to indicate similar components and as such, a description of the repeated components will be omitted. Unlike FIG. 1A, in FIG. 1B the remote key 103 is within the boundary 102 of the control unit 101. Once the remote key 103 is within a range of the control unit 101 there is an exchange of authorization messages between the remote key 103 and the control unit 101. An authorization message typically contains data that enables the control unit 101 to determine whether the remote key is authorized to unlock vehicle access or functionality. The control unit 101 is configured to unlock access to, and/or the functionality of, the vehicle 100 upon determining that the remote key 103 belongs to an authorized user.

The exchange of authorization messages discussed above occurs automatically. As a result, a user is not required to press a button on the remote key 103, or manually unlock the vehicle 100 in order to access the vehicle 100. While remote key entry is undoubtedly convenient for the user it can also be exploited by an unauthorized user to gain access to the vehicle by way of a relay attack or a replay attack.

Figure 2:
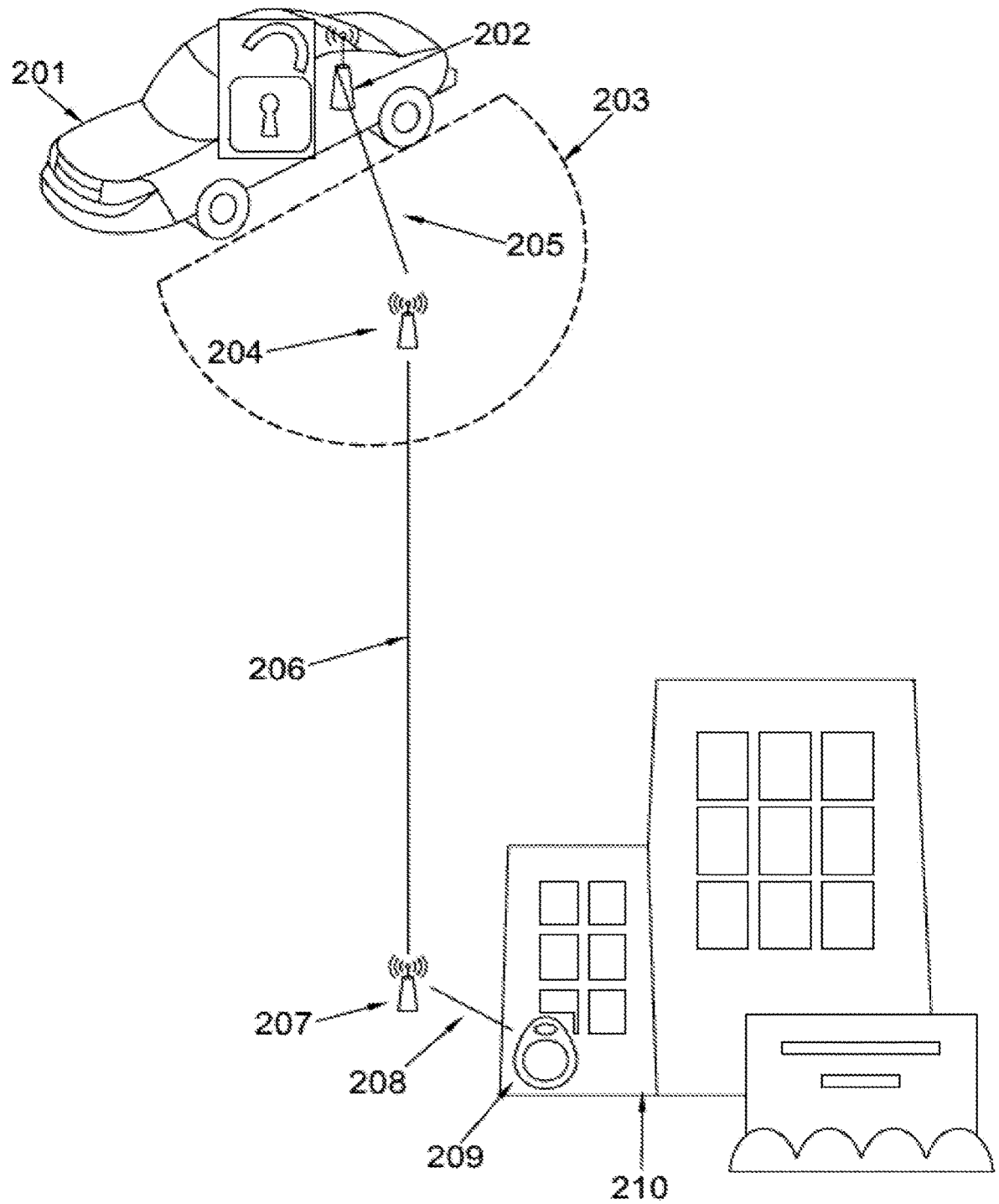
FIG. 2 shows a relay attack on a remote key entry system.

FIG. 2 shows a relay attack on a remote key entry system. FIG. 2 shows a vehicle 201 comprising a control unit 202. In FIG. 2, a remote key 209 of an authorized user is located within a building 210. The remote key 209 is outside the communicative range of the control unit (represented by a boundary 203) and would therefore not routinely cause the control unit 202 to unlock access to the vehicle 201. FIG. 2 also shows a first transceiver 204 located within the range of the control unit 202 (i.e. within the boundary 203) as well as a second transceiver 207 located within the range of the remote key 209.

The first transceiver 204 is communicatively coupled to the control unit 202 via a first communication link 205. The first transceiver 204 is also communicatively coupled to the second transceiver 207 via a second communication link 206. The second transceiver 207 is also communicatively coupled to the remote key 209 via a third communication link 208. At least the first communication link 205 and the third communication link 208 operate in the same frequency spectrum.

During a relay attack the first transceiver 204 and the second transceiver 207 replicate the signals transmitted by the control unit 202 and the remote key 209. In essence, the transceivers extend the range of the remote key 209 and the control unit 202 such that the control unit 202 perceives the first transceiver 204 to be the remote key 209 and the remote key 209 perceives the second transceiver 207 to be the control unit 202.

This is achieved by the second communication link 206 "relaying" the signals received by the first and second transceivers. The first and second transceivers subsequently transmit any signals received by the second communication link 206. In effect, copying the signals generated by the control unit 202 and the remote key 209. In this way, an unauthorized party is able to trick the control unit 202 into unlocking access to the vehicle 201.

Figure 3A:
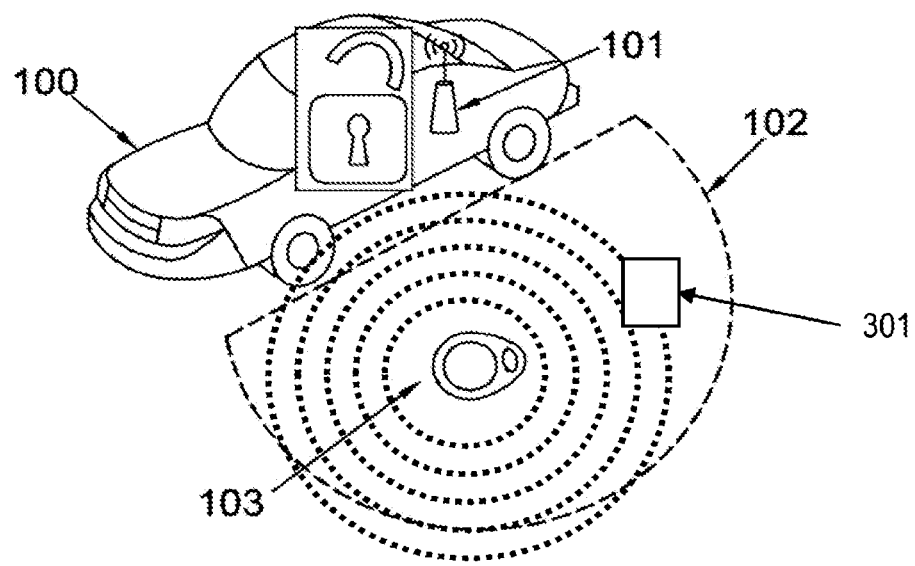
FIG. 3A shows a first part of a replay attack on a remote key entry system.

FIG. 3A shows a first part of a replay attack on a remote key entry system. FIG. 3A uses same reference numerals as FIG. 1A to denote same components. As a result, a detailed discussion will be omitted. FIG. 3A also shows a recording device 301 in communicative range of the remote key 103. In order to unlock access to the resource (which in this example is the car 100) the remote key 103 transmits authorization messages, the propagation of these transmissions is shown by the dashed circles around the remote key 103 in FIG. 3A. The recording device 301 is configured to record the signals transmitted by the remote key 103.

Figure 3B:
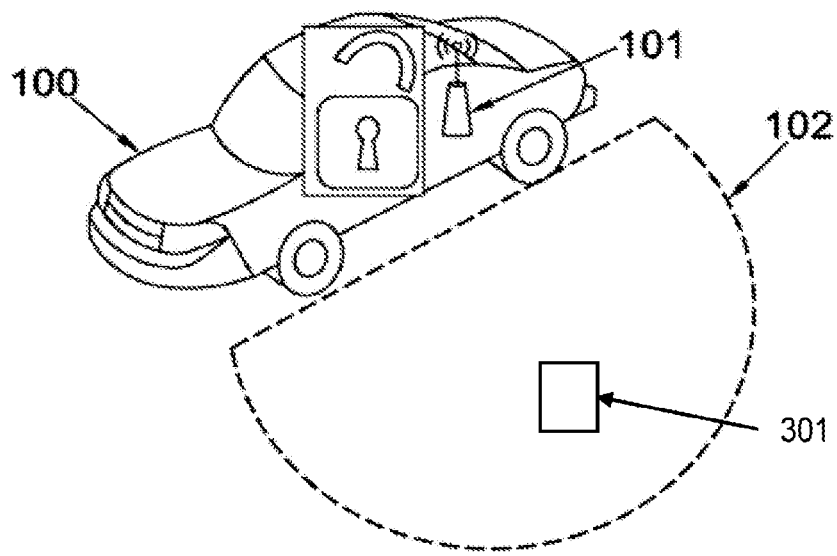
FIG. 3B shows a second part of a replay attack on a remote key entry system.

FIG. 3B shows a second part of a replay attack on a remote key entry system. The recording device 301 is also configured to transmit the recorded signals. Consequently, an unauthorized party (e.g. an attacker) is able to transmit signals identical to those transmitted by the remote key 103 in FIG. 3A. In response to receiving the transmissions, the control unit 101 unlocks access/functionality of the car 100 since the control unit 101 has received a valid authorization message. However, in this case the message does not originate from a legitimate user, using the remote key 103, but instead originates from an attacker replaying the previous transmissions of a legitimate user.

One way to prevent relay and replay attacks in keyless entry systems is to use a Distance Bounding (DB) technique that measures the time of flight of an incoming signal. In Distance Bounding (DB) techniques, a control unit transmits a challenge to the remote key/fob, which responds as soon as possible in a ping-pong manner. The control unit measures the time of flight (i.e. the time between a transmission and the associated response) to determine an upper bound of the distance to the key-fob. The control unit subsequently determines whether or not the remote key is located in the proximity of the vehicle. Although Distance Bounding (DB) techniques are conceptually simple, they are hard to realize in practice due to their requirement of high-time accuracy, which requires specialized hardware and an Ultra-Wide Bandwidth (UWB) channel. In light of this, a new approach to preventing replay and relay attacks in keyless entry systems is desired.

Figure 4A:
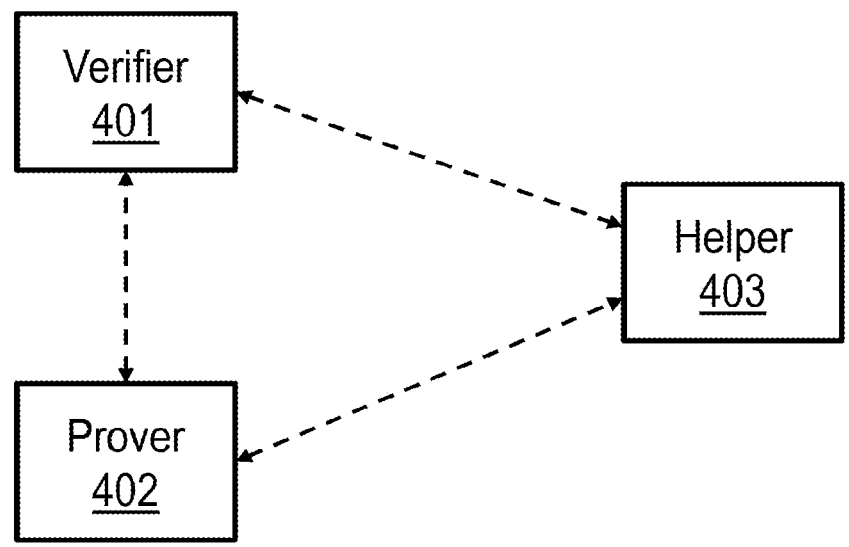
FIG. 4A shows a system according to an example.

FIG. 4A shows a system according to an example. In particular, FIG. 4A shows a keyless entry system comprising a verifier component 401, a prover component 402 and a helper component 403. The functionality and an implementation of the verifier, prover and helper components will be discussed in more detail below. However, as an introduction, the verifier component 401 is configured to communicate wirelessly with the helper component 403 and the prover component 402. In an example, the verifier component 401 is configured to receive wireless signals transmitted by the helper component 403 and the prover component 402 and transmit wireless signals to the prover component 402. The prover component 402 is also configured to communicate wirelessly with the helper component 402 and the verifier component 401. In an example, the prover component 402 is configured for bi-directional wireless communication with the verifier component 401 and is configured to receive wireless signals from the helper component 403. The helper component 403 is configured to transmit wireless signals to the verifier component 401 and the prover component 402.

Figure 4B:
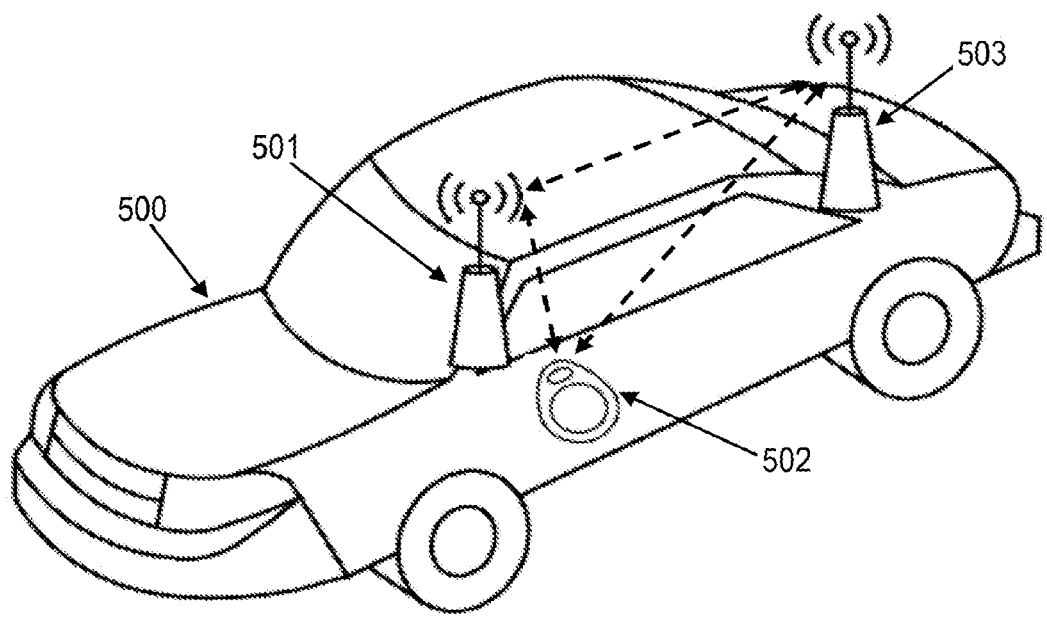
FIG. 4B shows a use-case for the keyless entry system according to an example.

FIG. 4B shows a use-case for the keyless entry system according to an example. In particular, FIG. 4B shows a use-case where the keyless entry system is used to control access to, and the functionality of, a car 500. In FIG. 4B there is provided a first transceiver 501 implementing the verifier component 401, a second transceiver 502, in the form of a key-fob, implementing the prover component 402 and a third transceiver 503 implemented the helper component 403. Optionally, the third transceiver 503 is a transmitter only (i.e. does not include receive capabilities).

The first, second and third transceivers are configured to communicate with each other at a first frequency. In FIG. 4B, the first transceiver 501 (implementing the verifier component 401) is positioned at a distance from the third transceiver 503 (implementing the helper component 403). The distance is greater than or equal to half a first wavelength, the first wavelength being the wavelength associated with the first frequency.

In FIG. 4B, the first transceiver 501 and the third transceiver 503 are fixed in position. For example, the third transceiver 503 is located at a rear of the car 500 (e.g. in the trunk/boot) and the first transceiver 501 is located close to a door handle (e.g. a door handle of the driver's door). The second transceiver 502 is located in a key-fob (also referred to as a remote key).

In use, the key-fob is held by a user, or in the proximity of the user (e.g. in a handbag held by the user). The second transceiver is therefore roaming and does not have a fixed location. As will be apparent from the description below, techniques described herein rely on the second transceiver 502 having a similar communication channel with the third transceiver 503 as the communication channel between the first transceiver 501 and the third transceiver 503. In a rich-multipath environment, two receivers that are placed less than half a wavelength apart will experience similar channel fluctuations on a reference signal transmitted from a distanced node. Consequently, the first transceiver 501 is also positioned such that a user is physically able to move the second transceiver 502 (in the form of a key fob) to be less than half the first wavelength from the first transceiver 501 (so that the first transceiver 501 and the second transceiver 502 experience the same communication channel with the distanced node, which in this case is the third transceiver 503).

In an example the first wavelength is 900 MHz, the distance between the third transceiver 503 and the first transceiver 501 is greater than 16 cm, the distance between the second transceiver 502 and the third transceiver 503 is greater than 16 cm and the first transceiver 501 is positioned such that the second transceiver 502 (e.g. in the form of a key fob) is able to be moved to a distance less than 16 cm from the first transceiver 501.

In the example of FIG. 4B where the first transceiver is located close to the door handle, the key fob (comprising the second transceiver 502) is positioned less than a half wavelength away from the first transceiver 501 when a user, holding the key fob, approaches the door handle. Although the example of FIG. 4B is discussed in relation to a specific frequency, it is emphasized for the avoidance of any doubt that other frequencies and therefore other distances could be used instead.

Figure 5:
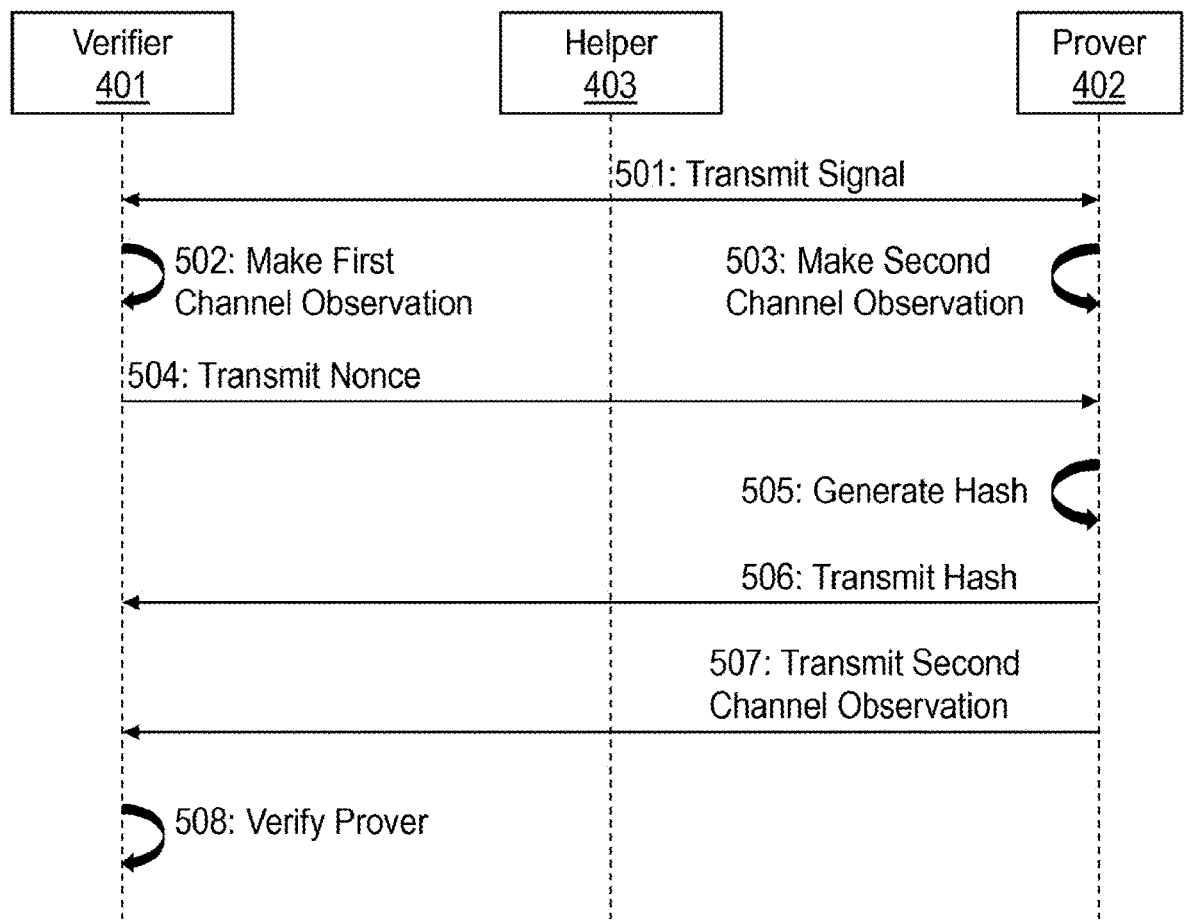
FIG. 5 shows a method performed by the keyless entry system according to an example.

FIG. 5 shows a method performed by the keyless entry system according to an example. The method begins in step 501 by the helper component 403 transmitting a signal. Various signals may be used. In an example where the third transceiver 503 implementing the helper node 403 is a dedicated node for implementing the methods described herein, the signal is an unmodulated carrier. In another example, the signal comprises a preamble. Optionally, the signal comprises a repeating structure (similar to the short training field in a WIFI signal) that is used to synchronize channel measurements at the receiving components (i.e. at the verifier component 401 and the prover component 402). The method proceeds to steps 502 and 503.

In step 502, the verifier component 401 makes a first channel observation. In step 503, the prover component 402 makes a second channel observation. A channel observation is also referred to as a link signature and/or a channel response.

Making a channel observation comprises measuring a property of the signal received at the verifier component 401 and the prover component 402 respectively. In an example making a channel observation comprises determining a property of the received signal (e.g. a received signal strength), sampling the property of the received signal (e.g. at a sampling rate), and quantizing the samples, all for a given period of time.

In an example, the sampling rate, the duration of period of time for which the channel is observed, and the quantization scheme is the same for both the verifier component 401 and the prover component 402. Optionally, the sampling rate, the period of time, and the quantization scheme is set during the system's design.

In an example, determining the property of the received signal by the verifier component 401 and the prover component 402 comprises measuring the Received Signal Strength (RSS). Advantageously, there are a plurality of commercially available devices for measuring the Received Signal Strength (RSS), so this is a convenient signal property to measure. In other examples, different properties of the received signal are determined. For example, in another example the amplitude and phase of the received signal is used to determine the property of the received signal. For the avoidance of doubt, it is emphasized that each of the verifier component 401 and the prover component 402 make independent measurements of the different received signal that they each observe.

Figure 6:
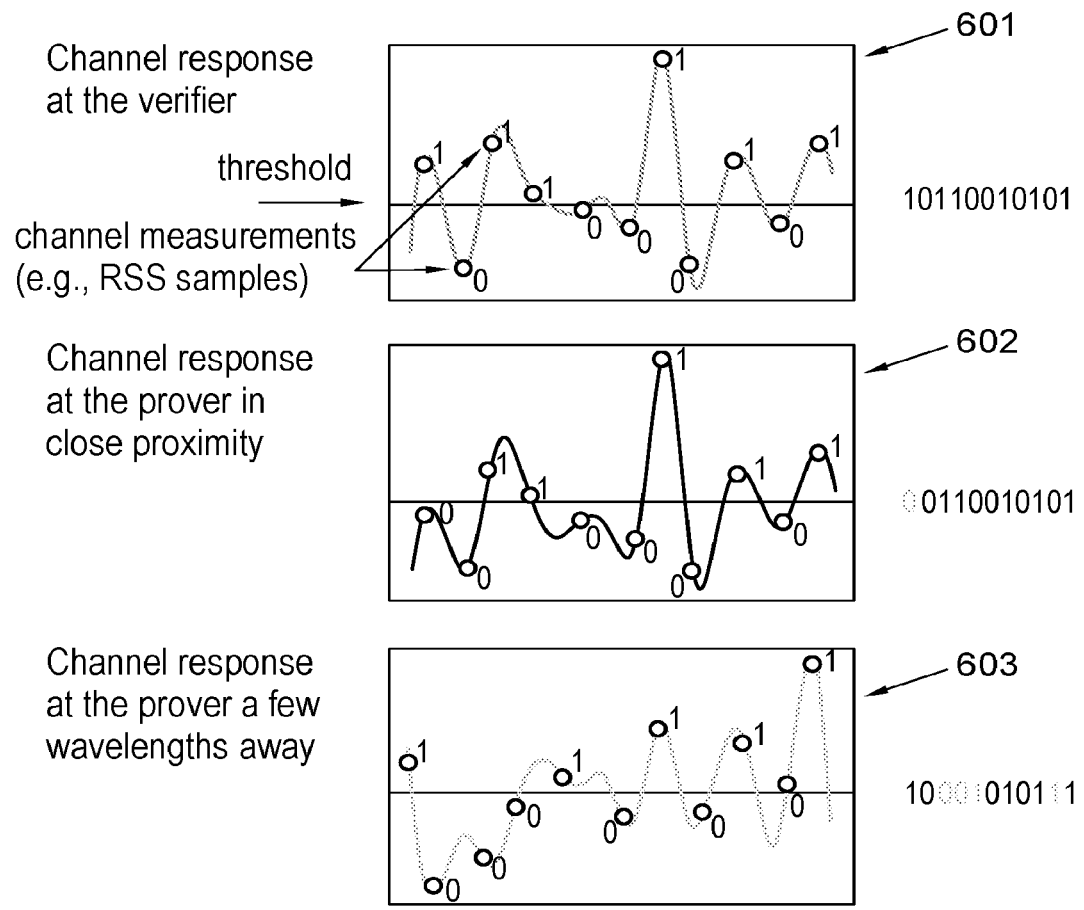
FIG. 6 shows channel observations according to an example.

FIG. 6 shows channel observations according to an example. A first graph 601 shows Received Signal Strength (RSS) measurements over a period of time at the verifier component 401. In the example of FIG. 6, the verifier component 401 samples the Received Signal Strength (RSS) as indicated by the dots on the waveform. The verifier component subsequently quantizes the sampled Received Signal Strength (RSS) measurements. In the example shown in FIG. 6, a single threshold is used to separate the samples between two states, in this case '1' and '0'. In an example, the threshold used for quantizing the Received Signal Strength (RSS) measurements is predetermined. In the example shown in the first graph 601, the channel observation obtained by the verifier component 401 is: "10110010101".

A second graph 602 shows a channel observation by a prover component 402 when the prover component 402 (e.g. in the form of a key fob) is in close proximity with the verifier component 401 (e.g. located near a car door). The prover component 402 follows a similar process to generate the channel observation as discussed for the verifier component 401. As discussed above, two receivers in close proximity (i.e. within ½ a wavelength) of each other will experience similar channel fluctuations. Consequently, if the prover component 402 and the verifier component 401 are in close proximity the channel observations will be highly correlated. This can be seen in the second graph 602, which shows the channel observation generated by the prover component as: "00110010101". In this case, the channel observations are highly correlated, the only difference being the first sample value, which for the verifier component 401 is "1", and for the prover component 402 is "0".

A third graph 603 shows a channel observation by a prover component 402 when the prover component 402 is not in close proximity with the verifier component 401 (e.g. when the prover component 402 is a few (e.g. one, two, three etc.) wavelengths away). In particular, the third graph 603 shows that the channel observation generated by the prover component 402 that is a few wavelengths away is: "10001010111". In this case, the received signal is not correlated with the signal received by the verifier component 401 as demonstrated by there being numerous differences in the channel observation.

In the example of FIG. 6, a single threshold is used by the verifier component 401 and the prover component 402 when making channel observations. However, it is emphasized for the avoidance of any doubt that a different number of thresholds could be used. For example, in other examples, binary quantization with two thresholds and/or multi-level quantization can be used.

Returning to FIG. 5, after completing step 502 the verifier component 401 obtains a first channel observation based on the signal received by the verifier component 401 from the helper component 403. Similarly, after completing step 503 the prover component 402 obtains a second channel observation based on the signal received by the prover component 402 from the helper component 403. The method proceeds to step 504.

In step 504, the verifier component 401 transmits a nonce to the prover component 402. As known in the art, a nonce is an arbitrary number that can be used just once. In an example, the nonce is a random or pseudo-random number.

The nonce is subsequently received by the prover component 402. The method proceeds to step 505.

In step 505, the prover component 602 generates a hash.

Figure 7:
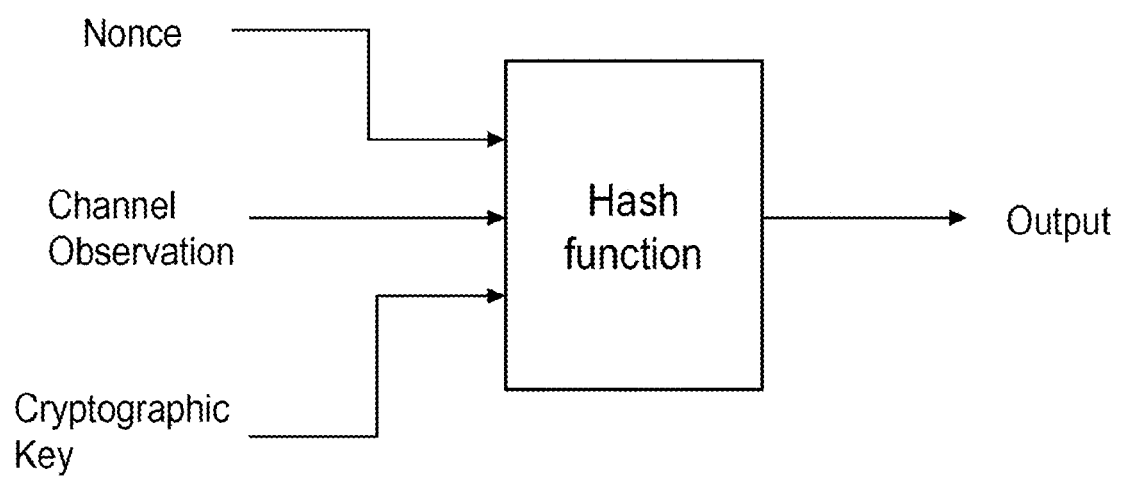
FIG. 7 shows an illustration of generating a hash according to an example.

FIG. 7 shows an illustration of generating a hash according to an example. In step 505, the prover component 402 generates a hash based on: a hashing function, the nonce (received from the verifier component 401), the channel observation (determined in step 503) and a cryptographic key.

The cryptographic key is a pre-shared cryptographic key and known to both the verifier component 401 and the prover component 402. In an example, the cryptographic key is only known to a valid verifier-prover pair. In this way, the cryptographic key represents a shared secret between the verifier component 401 and the valid key-fobs comprising associated prover components 402.

In step 505, the prover component 402 inputs the nonce, the channel observation and the cryptographic key into a hash function (otherwise referred to as a keyed hash function). Example hash functions that could be used by the prover component 402 include, but are not limited to: SHA-1, SHA-2 or MD-5 algorithms. In an example, the hash function is modified to take two inputs (i.e. the nonce and the channel observation). In other examples, the nonce and the channel observation are concatenated by the prover component 402 to create a single input before being input into the hashing function. After performing step 505, the prover component 402 obtains a hash. The method proceeds to step 506.

The total length of the inputs to the hash function and the total length of the output of the hash function should be long enough to be resilient against systematic eavesdropping and potential successful random guesses. The length of the channel observation (also referred to as the link signature) is determined based on, amongst other things, the duration of the channel quantization phase. A short length channel observation can be compensated by increasing the length of the nonce (thereby making the combination of the channel observation and the nonce harder to predict). However, a very short channel observation should be avoided so that two independent channel observations in close are similar to each other. For example, if the channel observation is only 2 bits long, any mismatch between two channel signatures due to thermal noise for example, will result in two observations that are highly dissimilar (in the case where 1 bit is different due to thermal noise, there will only be a 50% similarity). As will be discussed in more detail below, this could lead to the channel observations failing a similarity test even though the two channel observations are made in close proximity. Consequently, in an example, the channel observation is at least of a length (i.e. a number of bits) that is sufficient to provide a reliable similarity score between two independent measurements at similar locations (i.e. at locations where the channel observations would be expected to be similar, e.g. within ½ a wavelength of each other).

A minimum length (in bits) of the channel observation depends on a number of parameters including, but not limited to, the accuracy with which the verifier component 401 and the prover component 402 can make channel observations/measurements, as well as the quantization scheme used for making the channel observations. In an example, the channel observation, the nonce, and the hash output are each 128 bits long.

In step 506, the prover component 402 transmits the hash generated in step 505 to the verifier component 401. The hash is subsequently received by the verifier component 401. The method proceeds to step 507.

In step 507, the prover component 402 transmits the second channel observation obtained in step 503 to the verifier component 401. The second channel observation is subsequently received by the verifier component 401. In an example, the second channel observation is transmitted in plain text (i.e. unencrypted).

In the example shown in FIG. 5 the prover component 402 transmits the hash in step 506 and separately transmits the second channel observation in step 507. Although the example of FIG. 5 shows the information transmitted in two steps, it is emphasized that in other examples a single transmission from the prover component 402 to the verifier component 401 comprising the hash and the second channel observation could be made instead. The method proceeds to step 508.

In step 508 the verifier component 401 verifiers the prover component 402. Verifying the prover component 402 comprises determining whether the prover component 402 is valid (i.e. whether the prover component 402 is permitted/allowed to unlock access to the resource controlled by the verifier component 401) and determining whether the prover component 402 is located close to the verifier component 401 (close in this context includes within the vicinity of, and within a predetermined distance). An example method of verifying the prover component 402 is discussed in more detail below.

Figure 8:
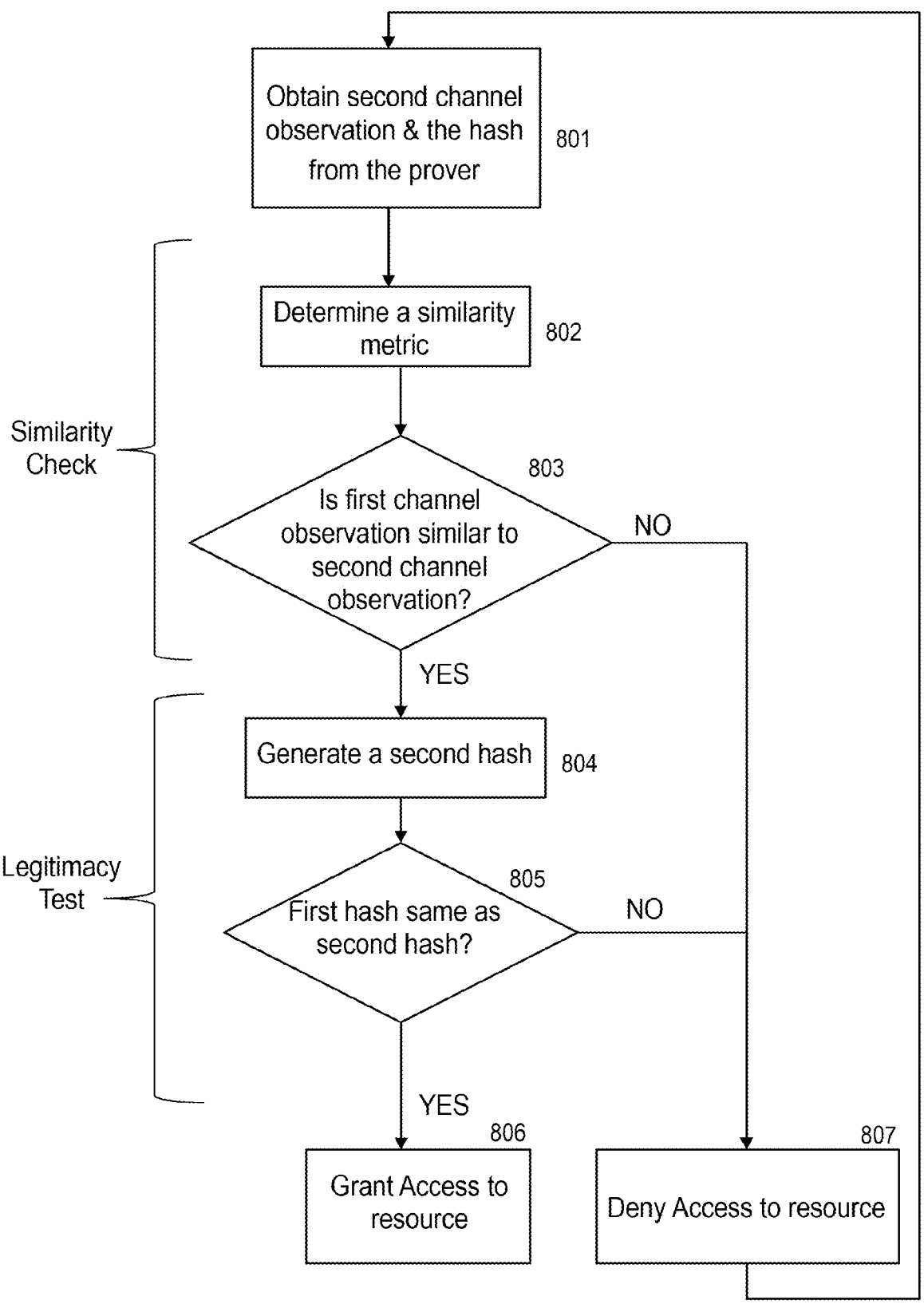
FIG. 8 shows a method of verifying the prover component according to an example.

FIG. 8 shows a method of verifying the prover component according to an example. The method begins in step 801 with the verifier component 401 obtaining the second channel observation and the hash received from the prover component 402 (received, for example, in steps 506 and 507). The verifier component proceeds to step 802.

In step 802 the verifier component 401 determines a similarity metric by determining an amount of similarity between the first channel observation (generated in step 502 by the verifier component 401) and the second channel observation (generated by the prover component 402 and sent to the verifier component 401). As discussed above, if the prover component 402 is located in close proximity to the verifier component 401 (e.g. within ½ a wavelength), the prover component 402 and the verifier component 401 will each observe similar channels. Consequently, their respective channel observations will be highly correlated.

In a first example, the verifier component 401 uses the Hamming Distance between the first channel observation and the second channel observation as the similarity metric. As known in the art, the Hamming distance between two binary numbers is the number of bit positions in which the respective values are different. For example, in the example shown in FIG. 6 where the verifier component's 401 channel observation is "10110010101" and the prover component's 402 channel observation is "0110010101", the Hamming Distance is 1 since only the first bit position has a different value.

Ideally, the verifier component 401 and the prover component 402 begin and end the channel measurements at the same time. However, in practice synchronization errors can occur. In an example, a pre-processing stage is performed before calculating the similarity metric in order to mitigate the effect of synchronization errors. In an example, the pre-processing stage comprises discarding the first bit and/or the last bit of both channel observations.

In a further example, determining the similarity metric comprises determining a correlation metric. Optionally, the correlation metric is a Pearson correlation. As known in the art, the Pearson correlation measures the linear relationship between two inputs. As a result, the Pearson correlation will automatically "forgive" any synchronization errors between the first and the second channel observations.

After determining a similarity metric in step 802, the method proceeds to step 803. In step 803, the verifier component 401 determines whether the first channel observation (generated by the verifier component 401) is similar to the second channel observation (generated by the prover component 402). In an example, determining whether the first channel observation is similar to the second channel observation comprises comparing the similarity metric generated in step 802 to a threshold. Optionally, the threshold is predetermined. In an example, a predetermined threshold is determined based one or more of: the statistics of the channel model, the choice of similarity metric and the level of security required.

The test used to determine whether the first channel observation is similar to the second channel observation depends on the similarity metric used in step 802. For example, in the case where the Hamming distance is used as a similarity metric, the first channel observation is similar to the second channel observation if the similarity metric is less than a threshold (i.e. if the difference between the two observations is less than a predetermined number of bits). In contrast, if the Pearson correlation is used as the similarity metric then the first channel observation is similar to the second channel observation if the similarity metric is greater than a threshold (indicating a high correlation between the first channel observation and the second channel observation). The combination of steps 802 and 803 is referred to as the "similarity check", because these tests determine whether the verifier component 401 and the prover component 402 are located in similar locations.

If it is determined in step 803 that the first channel observation is similar to the second channel observation (or in other words, if the similarity check passes) then the method proceeds to step 804 to perform a second test.

In step 804, the verifier component 401 generates a second hash. The verifier generates a second hash in the same way as was discussed in relation to FIG. 7 for the prover component 402. However, in step 804 the verifier component 401 generates a hash based on different inputs. In particular, the verifier component 401 generates the second hash based on the nonce generated by verifier component 401 (and subsequently transmitted in step 504) and the second channel observation (i.e. the channel observation received from the prover component 402).

The hashing algorithm used by the verified component 401 is a keyed hashing algorithm (i.e. an algorithm that uses a cryptographic key). In this case, the verifier component 401 retrieves its cryptographic key. If the verifier component 401 and the prover component 402 are a valid pair (i.e. the prover component 402 is intended to unlock functionality controlled by the verifier component 401), the cryptographic keys used by the verifier component 401 and the prover component 402 will be the same. It is emphasized, for the avoidance of any doubt, that the cryptographic key used to generate the second hash in step 804 is retrieved by the verifier component 401, for example, from local storage and this cryptographic key is not communicated from the prover component 402 to the verifier component 401.

As discussed above in relation to FIG. 7, the hashing algorithm implemented by the verifier component 401 may be modified to take two inputs (i.e. the nonce generated by the verifier component 401 and the second channel observation received from the prover component 402), or the two inputs may be concatenated and input into a hashing algorithm that takes a single input. The output of the hashing algorithm implemented by the verifier component 401 is a second hash. The method proceeds to step 805.

In step 805 it is determined whether the first hash (received from the prover component 402 in step 506) is the same as the second hash (generated by the verifier component in step 804). If the verifier-prover pair is legitimate then the first hash and the second hash will be the same, because the inputs to the hash functions will be the same and the cryptographic keys used by the hash functions will be the same. Steps 804 and 805 are referred to as the "legitimacy test". Unlike the "similarity check" which tests whether the prover component 402 is located close to the verifier component 401, the legitimacy tests checks whether the verifier component and the prover component have access to the same cryptographic key and therefore are a legitimate verifier-prover pair. If it is determined in step 805 that the first hash and the second hash are the same (or in other words, if the legitimacy test is passed) then the method proceeds to step 806.

In step 806, the verifier component 401 grants access to the resource. In an example, the verifier component 401 grants access to the resource by unlocking a lock (i.e. causing a lock to be moved from a locked state to an unlocked state). In a further example where the verifier component 401 is used in the car 500, granting access to the resource comprises the verifier component 401 causing the car 500 to unlock the car 500 and enable the car 500 to be driven, for example by transmitting a signal to the locking system that causes the locking system to configure itself in an unlocked state.

Alternatively, the method proceeds to step 807 if it is determined in step 803 that the first channel observation is not similar to the second channel observation (or in other words, if the "similarity check" fails) or it is determined in step 805 that the first hash is not the same as the second hash (or in other words, if the "legitimacy test" fails). In an example, denying access to the resource in step 807 comprises causing a lock to be configured in the locked state. In a further example where the verifier component 401 is used in the car 500, granting access to the resource comprises the verifier component 401 causing the car 500 to be in a locked state (e.g. locking the doors to the car 500 and restricting the functionality of the car 500).

After denying access to the resource in step 807, the method proceeds to step 801 where the process of verifying the prover component 402 is repeated. In an example, the verifier component 401 waits until a new hash and a new channel observation have been received from the prover component 402 before repeating the method at step 801.

Figure 9A:
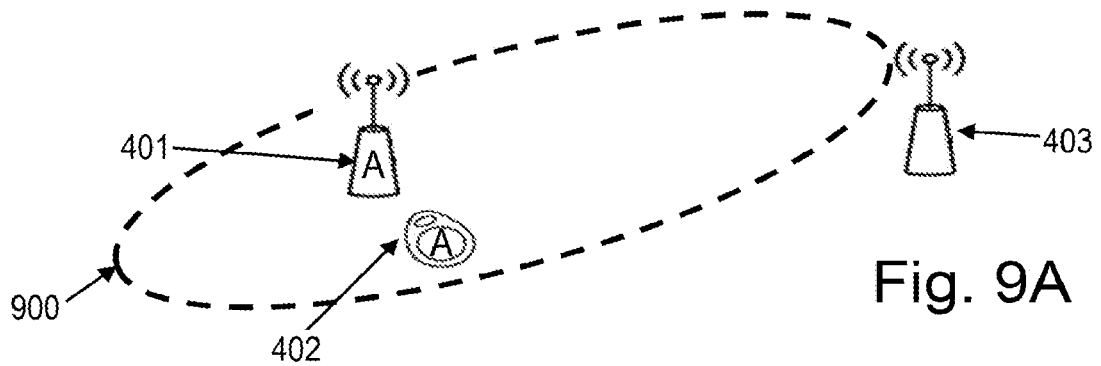
FIG. 9A shows a first example scenario.

FIG. 9A shows a first example scenario. FIG. 9A uses the same reference numerals as FIG. 5 to denote same components, as a result a detailed discussion will be omitted. FIG. 9A also shows a region 900 in which the channel to the helper component 403 is similar. In an example, the width of the region 900 is equal to ½ a wavelength of the waveform transmitted by the helper component 403.

In the example of FIG. 9A, the verifier component 401 has access to cryptographic key 'A', and the prover component 402 has access to cryptographic key 'A'. In this case, the verifier component 401 and the prover component 402 are a legitimate verifier-prover pair. Applying the methods described in FIG. 5 and FIG. 8, the verifier component 401 receives a channel observation and a hash from the prover component 402. Because the prover component is located within the region 900, the first channel observation (made by the verifier component 401) and the second channel observation (made by the prover component 402) will be similar, consequently the "similarity check" in FIG. 8 passes. Furthermore, since the cryptographic keys are the same, the first and second hash will be the same, so the "legitimacy test" in FIG. 8 passes, thereby granting access to the resource.

Figure 9B:
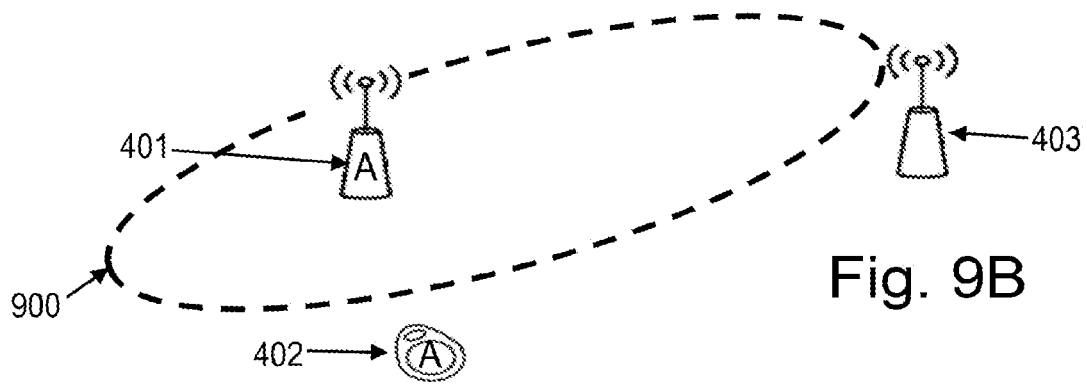
FIG. 9B shows a second example scenario.

FIG. 9B shows a second example scenario. FIG. 9B uses same reference numerals as FIG. 9A to denote same features. In FIG. 9B the prover component 402 (e.g. which is implemented in a key-fob) is located outside the region 900. Consequently, the channel observations generated by the verifier component 401 and the prover component 402 will not be similar and the "similarity check" in FIG. 8 fails. As a result, access to the resource will be denied.

Figure 9C:
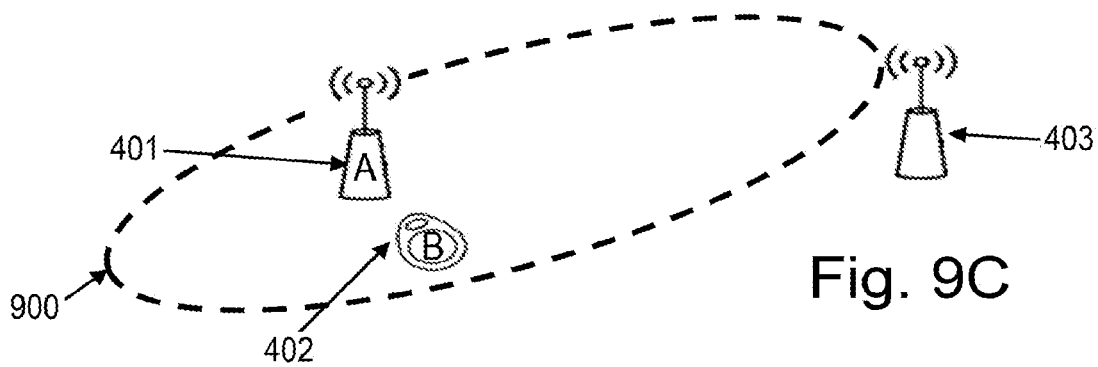
FIG. 9C shows a third example scenario.

FIG. 9C shows a third example scenario. FIG. 9C uses same reference numerals as FIG. 9A to denote same features. In FIG. 9C, the prover component 402 is associated with cryptographic key 'B', whereas the verifier component 401 is associated with cryptographic key 'A'. In this case, the channel observations made by the verifier component 401 and the prover component 402 will be similar, consequently the "similarity check" in FIG. 8 passes. However, the cryptographic keys are different, consequently the keyed hash generated by the verifier component 401 and the prover component 402 will be different. Consequently, the "legitimacy test" fails and access to the resource is denied.

Figure 9D:
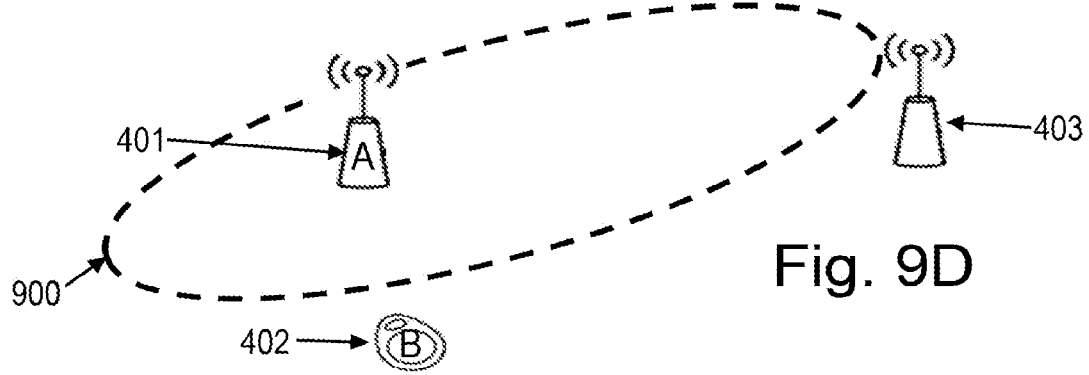
FIG. 9D shows a fourth example scenario.

FIG. 9D shows a fourth example scenario. FIG. 9D uses same reference numerals as FIG. 9A to denote same features. In FIG. 9D, the prover component is located outside of region 900. Consequently, the first and second channel observations will be different. As a result, the "similarity check" in FIG. 8 fails and access to the resource is denied.

In some use-cases it may be that the channel randomness provided by the environment in which the keyless entry system is located is not sufficient for the channel observations to be used as a proximity check. For example, in the case of an open car park, it is possible that a channel observed by a prover component 402 could be similar to a channel observed by the verifier component 401, despite the components being located in different locations (e.g. at similar distances on opposite sides of the helper component 403). In the case of an open car park there would be very little multipath, consequently if the prover component 402 and the verifier component 401 were located on opposite sides of the helper component 403 but at a similar distance, the received signals (and therefore the channel observations) would be similar since they would experience similar fading. In this case, similar channel observations cannot be used as a proxy for the components being located close to each other. In order to solve this problem, further embodiments of the keyless entry system implement random beam steering at the helper component 403.

As known in the art, beam steering is a technique for changing the direction of an antennas radiation pattern, particularly the main lobe, thereby changing the transmission direction. There are various known techniques for beam steering including analogue beamforming, digital beamforming and mechanical/electrical steering, all of which can be used by the helper component 403 according to embodiments described herein.

Figure 10A:
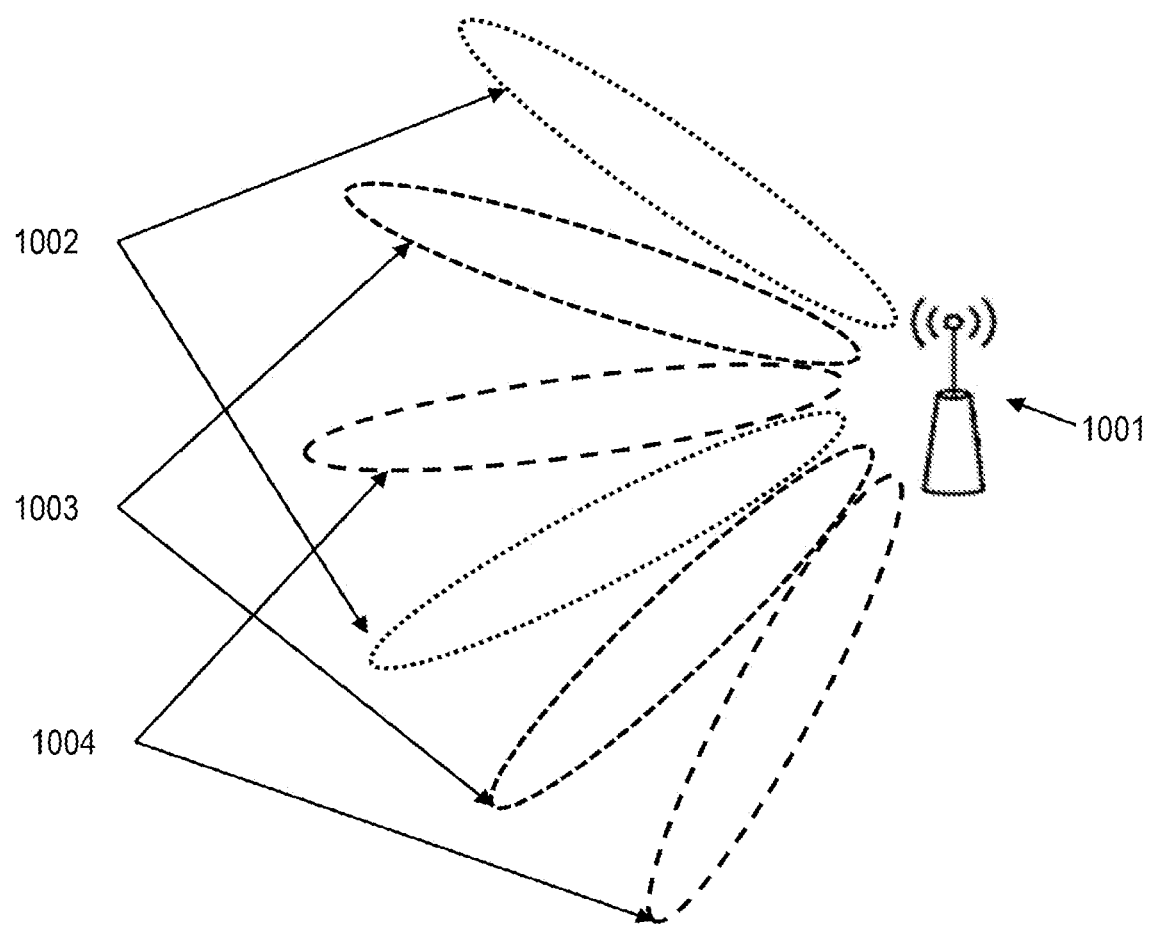
FIG. 10A shows a helper component that uses beam steering according to an example.

FIG. 10A shows a helper component that uses beam steering according to an example. FIG. 10A shows a third transceiver 1001, that implements the helper component 403. The third transceiver 1001 comprises an antenna and a beam steering component configured to control the transmission direction of the third transceiver 1001. In an example, the beam steering component controls the transmission direction of the antenna using one of: analogue beamforming, digital beamforming and mechanical/electrical steering.

In an example the third transceiver 1001 is configured to transmit the helper's signal (i.e. the signal transmitted in step 501) on multiple beams (i.e. greater than two beams).

In FIG. 10A, the radiation pattern (i.e. the transmission direction) is different at different times. At a first time instant 1002, the third transceiver 1001 transmits the helper's signal (e.g. transmitted in step 501) in a first and a second direction. At a second time instant 1003, the third transceiver 1001 transmits the helper's signal (e.g. transmitted in step 501) in a third and a fourth direction. At a third time instance 1004, the third transceiver 1001 transmits the helper's signal (e.g. transmitted in step 501) in a fifth direction and a sixth direction. Each of the first to sixth directions being different from each other.

The example show in FIG. 10A shows beam steering being applied to multiple beams (i.e. greater than two beams). In other examples, the helper's signal is transmitted on a single beam and that single beam is beam-steered (such that the direction of the radiation pattern changes at different points in time).

Figure 10B:
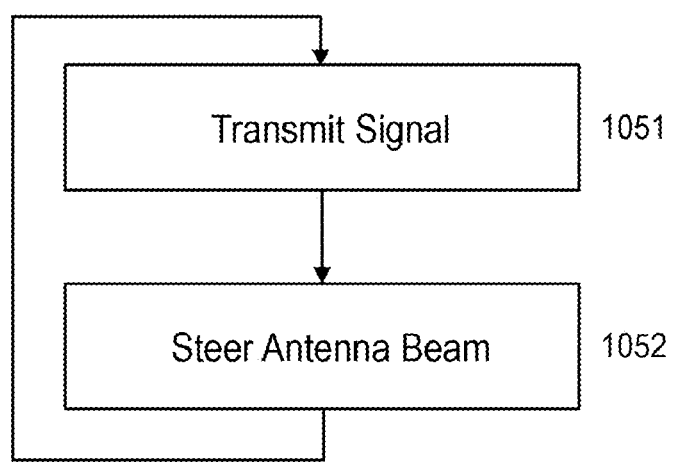
FIG. 10B shows a method performed by the third transceiver according to an example.

FIG. 10B shows a method performed by the third transceiver according to an example. The method begins in step 1051 by the third transceiver 1001 transmitting the transmit signal. This step is the same as step 501 in FIG. 5. In step 1051 the signal is transmitted with the antenna in a first configuration (e.g. configured to transmit the signal with beams in a first direction, or plurality of directions). The method proceeds to step 1052.

In step 1052 the antenna beam is steered. Put in other words, the radiation pattern of the antenna at the third transceiver 1001 (which implements the helper component 403) is changed from the first configuration to a second configuration where the third transceiver 1001 is configured to transmit the signal with beams in a second direction, or a second plurality of directions. In essence, in this step the direction of the main lobe(s) of the radiation pattern is changed. The method proceeds to step 1051 where the signal is transmitted (i.e. repeating step 501). In an example there is a delay before re-transmitting the signal in step 1051 (i.e. repeating step 501). In an example, the first direction (or first plurality of directions) is different from the second direction (or second plurality of directions).

Advantageously, as the beam steers, the transmitted signal (transmitted by the helper component 403) reaches the two receivers (i.e. the verifier component 401 and the prover component 402) via different multipaths, resulting in fluctuations in phase and amplitude, and consequently fluctuations in the Received Signal Strength (RSS), which in an example is used to quantize the channel to the transmitted. Consequently, when beam steering is used, the channel to the helper component 403 changes at different time instants (i.e. as the beam steers) and at different locations.

In an example, the beam steering is random. That is to say, the next angle or set of angles of the radiation pattern main lobe is randomly determined. In this case, in step 1052 the next radiation direction is selected randomly, before the third transceiver 1001 is appropriately configured to transmit a signal in that direction (e.g. using any of one: analogue beamforming, digital beamforming, mechanical/electrical steering).

Random beam-steering creates a dynamic channel (i.e. a communication channel that changes in time) that is location sensitive and that cannot be predicted. Only two receivers in close proximity will experience the same channel fluctuations on the received signal. Advantageously, random beam steering introduces some randomness in the channels that are measured/observed by the receivers. Consequently, random beam steering at the helper component 403 ensures that a similar channel observation can be used as a proxy for being located in a similar position (thereby indicating proximity to the resource being unlocked).

The maximum distance at which the channels at the two receivers remain correlated depends on the operated frequency, the direction of the beam, and the geometry of the environment. As discussed above, in a rich multipath environment this could be ½ a wavelength of the transmission frequency. In practical scenarios, the channels may remain correlated for longer distances, e.g. up to multiple wavelengths either due to a small number of scatters or due to the existence of dominant paths.

There is also provided a number of ways to protect against a brute force attack. As known in the art, a brute force attack is when a malicious party generates and submits many attempts to gain access to a resource with the hope of eventually guessing the credentials requires to gain access.

In this case, a brute force attack could arise from a malicious party guessing the hash (transmitted in step 506). It is noted that a malicious party would not have access to the cryptographic key shared by a legitimate verifier-prover pair, and so does not have the capability to generate the hash in the same way as a legitimate prover component 402. However, a legitimate party could guess a hash value in a brute force attack to gain access to the resource.

As discussed above, one way to prevent against a brute force attack is by appropriate selection of the inputs to and outputs from the hash function implemented by a prover component 402. For example, a hash function with a longer output reduces the ability of a malicious party to randomly guess a valid hash. In a further example, an attempt counter is maintained by a verifier component 401 to prevent brute-force attacks.

Figure 11:
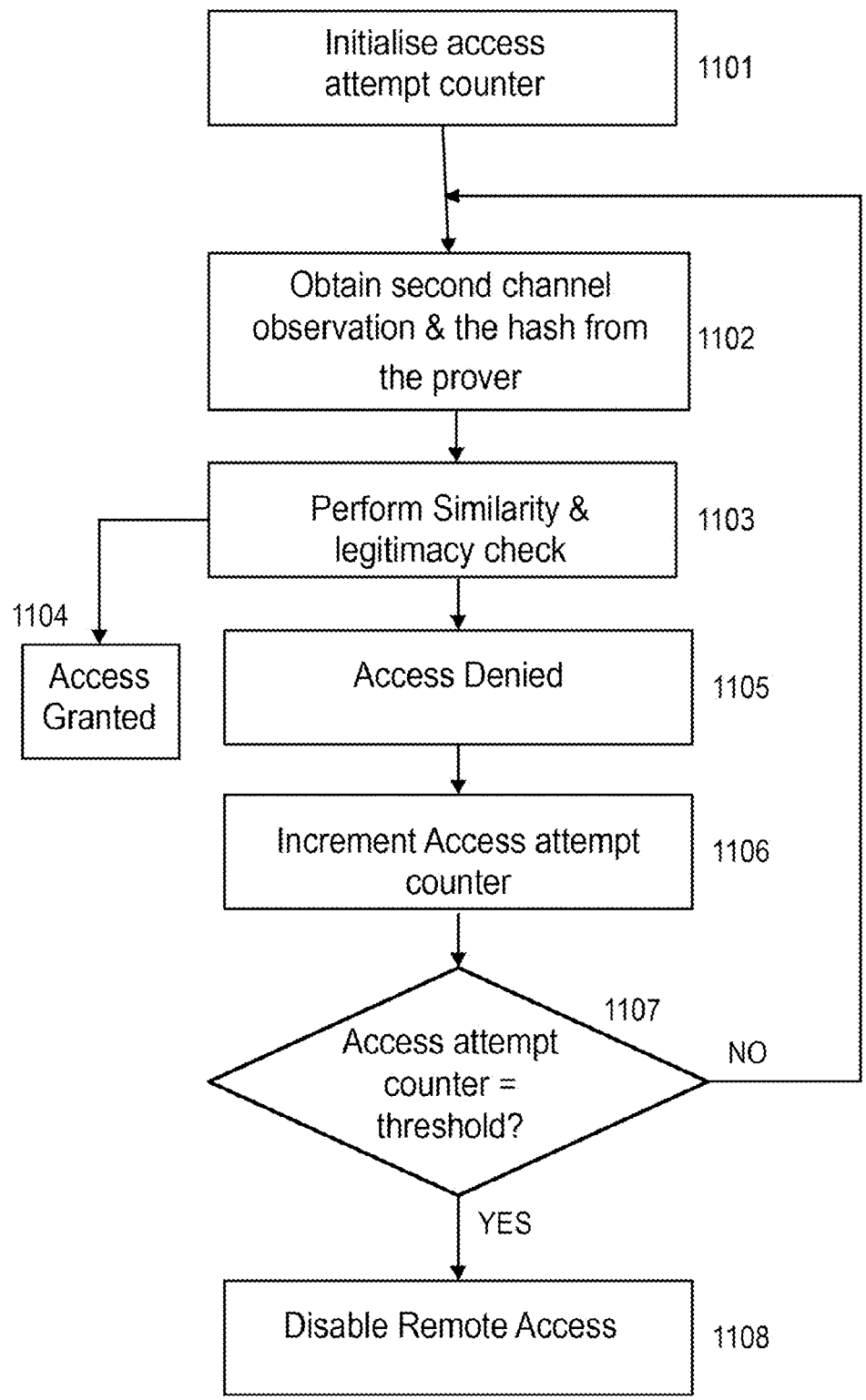
FIG. 11 shows a method of verifying the prover component with brute-force protection according to an example.

FIG. 11 shows a method of verifying the prover component with brute-force protection according to an example. In an example, the method of FIG. 11 is implemented by a verifier component 401. The method begins in step 1101 by initializing an access attempt counter. Optionally the access attempt counter is set to zero. In an example, the access attempt counter is represented by a variable stored in memory. The method proceeds to step 1102.

In step 1102, the verifier component 401 obtains a second channel observation and the hash from the prover component 402. This step is the same as step 801, discussed in relation to FIG. 8 above. The method proceeds to step 1103.

In step 1103, the verifier component 401 performs the "similarity check" and the "legitimacy test". Step 1102 comprises steps 802, 803, 804, and 805 as discussed in relation to FIG. 8 above. If the "similarity check" and "legitimacy test" are passed then the method proceeds to step 1104 where access is granted. Optionally, after granting access in step 1104, the method proceeds to step 1101 where the access attempt counter is initialized again (e.g. to 0) for subsequent access attempts. If, on the other hand, the prover component 402 fails either of the "similarity check" or the "legitimacy test" then the method proceeds to step 1105 where access to the resource is denied. After step 1105, the method proceeds to step 1106.

In step 1106, the method increments the access attempt counter. The method proceeds to step 1107.

In step 1107, the method determines whether the access attempt counter equals a threshold. Optionally the threshold is predetermined. If the access attempt counter is equal to or greater than a threshold, the method proceeds to step 1108. In step 1108 remote access is disabled (i.e. the resource cannot be accessed using the keyless entry system any longer). If it is determined that the access attempt counter in step 1107 is equal to the threshold, then there have been too many unsuccessful attempts at unlocking access to the resource. In a brute force attack, a malicious part randomly guesses hash values in the hope of obtaining a hash value that is valid and unlocks the resource. A successful brute force attack often requires a large number of guesses. In this case, after the threshold number of guesses, access to the resource using remote key less entry will be disabled. Consequently, the method of FIG. 11 is robust against brute force attacks. In an example, after a predetermined number of attempts remote access is disabled and access to the resource requires a back-up approach (such as a physical key when attempting to access a vehicle).

If in step 1107 it is determined that the access attempt counter does not equal the threshold, or equally that the access attempt counter is less than the threshold, then the method proceeds to step 1102 where the access procedure (e.g. awaiting a second channel observation and hash from the prover component 502, performing the "similarity check" and "legitimacy test" etc.) is re-attempted.

In the example shown in FIG. 11, it is the absolute number of access attempts that is recorded. In another example, an amount of access attempts in a given time is calculated and compared to the threshold in step 1107.

In a further example there is also provided a method of verifying the prover component that is resilient to sophisticated relay attacks.

Figure 12:
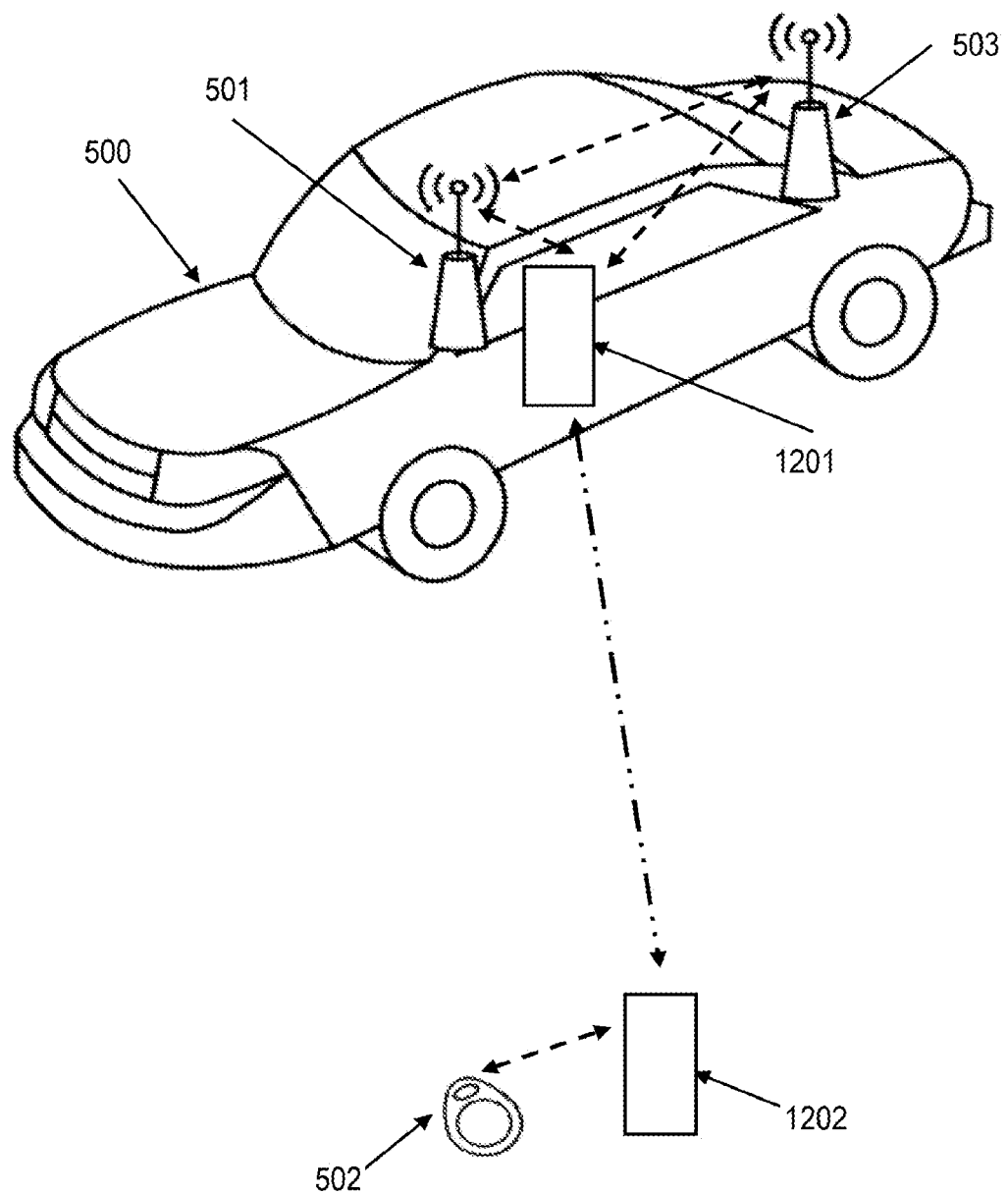
FIG. 12 shows an example of a sophisticated relay attack.

FIG. 12 shows an example of a sophisticated relay attack. FIG. 12 uses same reference numerals as FIG. 5 to denote same features. FIG. 12 also shows a first attack node 1201 and a second attack node 1202. In this a sophisticated relay attach the two attack nodes co-operate with each other. The first attack node 1201 is located close to the first transceiver 501 (implementing the verifier component 401) and impersonates a valid key fob while the second node is located close to the key fob 502 (implementing the prover component 402) and impersonates the verifier component 401.

In this attack, the first attack node 1201 obtains a channel observation (to the helper component 403 implemented by the third transceiver 503) that is similar to the true verifier (i.e. the first transceiver 501 implementing the verifier component 401) because the first attack node 1202 is located in close proximity to the first transceiver 501.

The first attack node 1201 relays the channel observation to the second attack node 1202. The second attack node 1202 is able to control the channel observed by the (true) key fob 502 (e.g. by controlling transmissions made by the second attack node 1202). Consequently, in this attack the second attack node transmits a signal with an amplitude which, when received at the (true) key fob 502 varies in a similar way to the channel observed by the first attack node 1201 (and the first transceiver 501).

It will be noted that this is not a trivial exercise, because to achieve this effect the second attack node 1202 needs to be aware of the channel between the second attack node and the key fob 502. As a result, this attack is technically difficult to perform. Nevertheless, in this attack after relaying the channel observation (so the key fob makes a channel observation as if it was located proximate to the verifier component), the verifier component 401 transmits the nonce, this nonce is relayed via the first attack node 1201 and the second attack node 1202 to the key fob.

In response to receiving the nonce, and using the generated channel observation, the key fob generates a (legitimate hash) and transmits the hash and channel observation as discussed above. It will be appreciated that this hash is a "legitimate" hash because it is generated by a valid key fob (with access to the shared cryptographic key). The transmissions from the key fob are relayed via the second attack node 1202 and the first attack node 1201 to the first transceiver 501 implementing the verifier component 401. It will be noted that access to the resource will be granted because the "legitimacy test" will pass because the received hash will match a generated hash (since the received hash was generated by a valid key fob) and the "similarity test" will also be passed because the attacker nodes cause the key fob 502 to perceive a channel observation that is the same/similar as if it had been located next to the first transceiver 501 (implementing the verifier component 401).

In a further example there is also provided a method of verifying the prover component that is resilient to sophisticated relay attacks.

Figure 13:
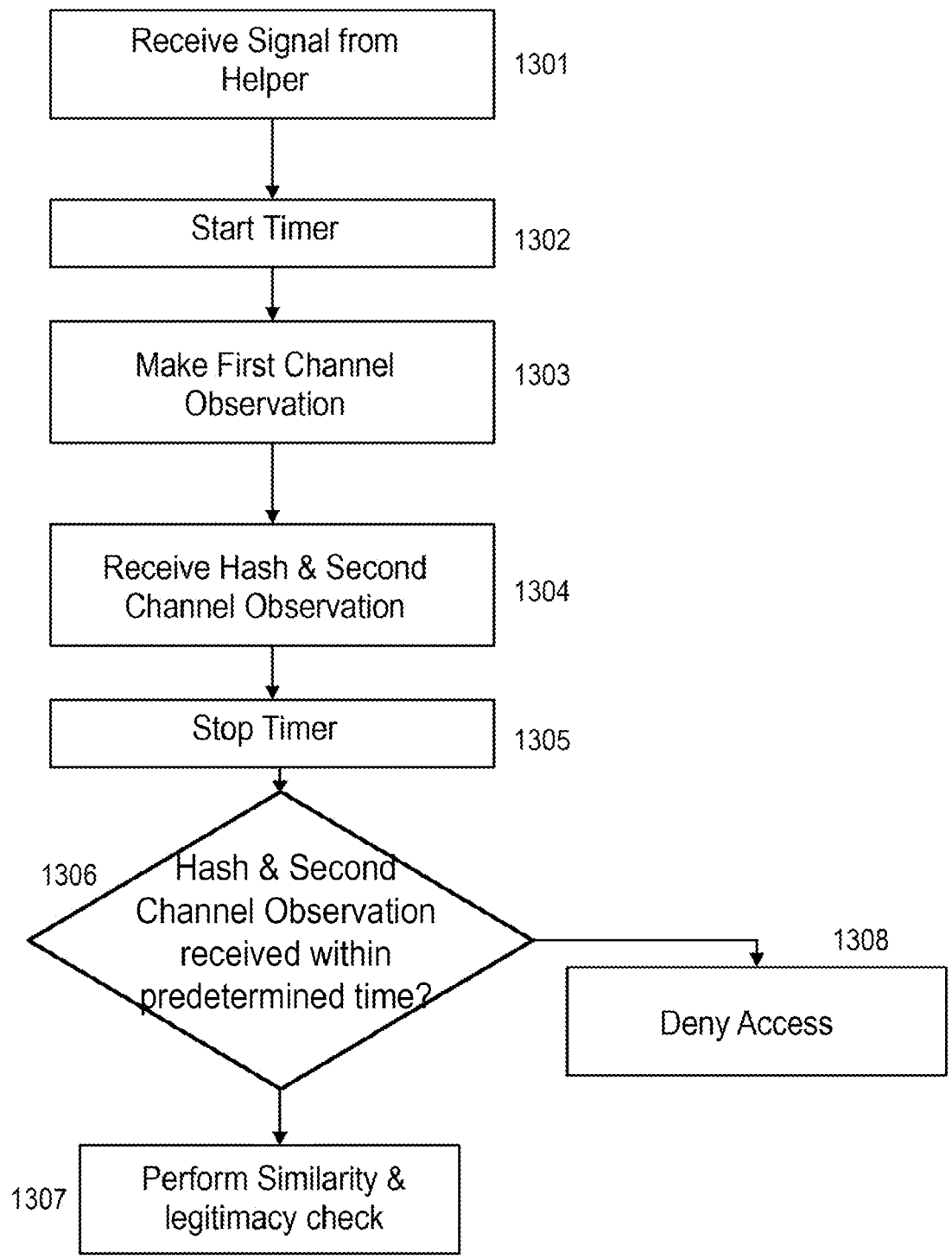
FIG. 13 shows a method of verifying the prover component that is resilient to sophisticated relay attacks according to an example.

FIG. 13 shows a method of verifying the prover component that is resilient to sophisticated relay attacks according to an example. In an example, the method of FIG. 13 is implemented by a verifier component 401. The method begins in step 1301. In step 1301, the verifier component 401 receives the signal from the helper component 403. This step is the same as step 501 in FIG. 5. The method proceeds to step 1302.

In step 1302, the method starts a timer. Put in other words, the method starts measuring time. The method proceeds to step 1303.

In step 1303 a first channel observation is made (e.g. by the verifier component 401). This step is the same as step 502 as discussed in relation to FIG. 5. The method proceeds to step 1304.

In step 1304 a hash and a second channel observation is received (e.g. by the verifier component 401 from the prover component 402). This step is the same as steps 506 and 507 as discussed in relation to FIG. 5. The method proceeds to step 1305.

In step 1305, the method stops the timer that was started in step 1302. Consequently, the method obtains a measurement of the time between steps 1302 and step 1305. The method proceeds to step 1306.

In step 1306 it is determined whether the hash and the second channel observation received in step 1304 (e.g. from the prover component 402 to the verifier component 401) was received within a predetermined time.

In an example, step 1306 comprises comparing the value of the timer started in step 1302 and stopped in step 1305 with a predetermined value. In an example, the predetermined time value is set based on system parameters. Optionally the predetermined time value equals T1+T2, where T1 is the duration of the quantization phase (i.e. the time taken from first receiving the transmit signal to generating a full channel observation of the length predetermined by the system) and T2 is the duration of the challenge and hash processes. In this case, T2 is the time taken for a verifier node 401 to transmit the nonce to a nearby prover, the time for the prover to generate the hash and the time for the hash and the second channel observation transmitted by the prover 402 to be received at the verifier component 401. In an example, T1 and T2 are predetermined and are provided as system parameters.

If it is determined in step 1306 that the time value is less than the predetermined time then the method proceeds to step 1307 where the "similarity check" and "legitimacy test" are performed. This step is the same as steps 802-805 as discussed in relation to FIG. 8. Based on the similarity check and legitimacy test in step 1306, access to the resource is either granted or denied as discussed in relation to steps 806 and 807 of FIG. 8.

If on the other hand it is determined in step 1306 that the hash and the second channel observation were not received within the predetermined time then the method proceeds to step 1308 where access to the resource is denied. Optionally, the method subsequently proceeds to step 1301 to repeat the process.

In the case of a valid attempt, the time taken between receiving the signal from the helper and receiving the hash and the second channel observation will be less than T1+T2 because the times are based on the time taken (e.g. the time of flight) to communicate messages between a valid verifier-prover pair that are located within a close distance of each other.

In the case of a sophisticated relay attack as shown in FIG. 13, the time taken for the hash and the second channel observation to be received by the verifier component 401 will be much larger because the messages need to be communicated over the communication link between the first attack node 1201 and the second attack node 1202. Consequently, in the case of a sophisticated relay attack the timer value will be greater than the predetermined threshold and access will be denied (irrespective of whether the similarity check and legitimacy check would be passed).

In order to implement this approach it is noted that the verifier component 401 does not require a high-time accuracy in contrast to other time-based Distance Bounding (DB) techniques. This is because in this technique nanosecond accuracy is not required for the times in steps 1302 and 1305. Instead, the duration of the processes represented by times T1+T2 is much larger and easy to measure without requiring specialized timing hardware.

Figure 14:
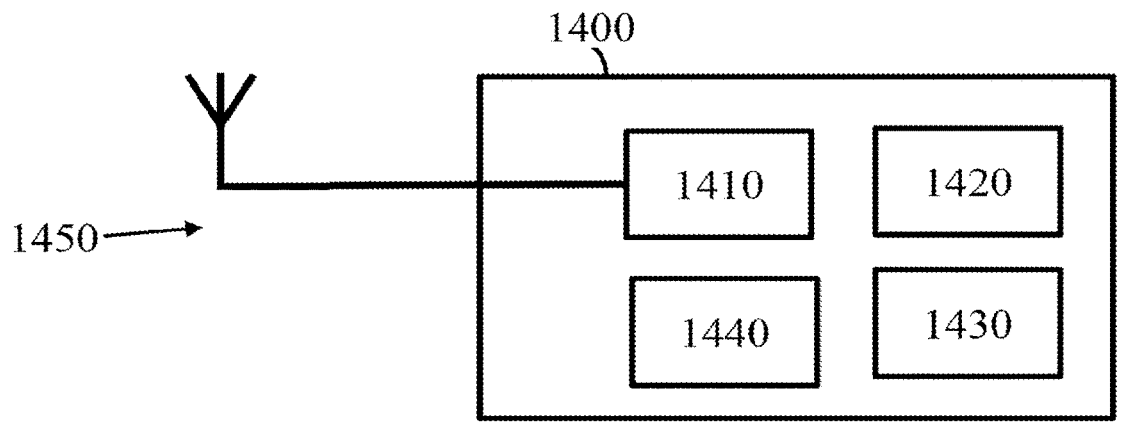
FIG. 14 shows a transceiver according to an embodiment.

FIG. 14 shows a transceiver according to an embodiment. In an example, the transceiver 1400 implements the functionality of the verifier component 401. In another example, the transceiver 1400 implements the functionality of the prover component 402. In yet another example the transceiver 1400 implements the functionality of the helper component 403.

The transceiver 1400 comprises a Radio Frequency (RF) input/output port 1410, a processor 1420, a non-volatile memory 1430 and optionally a control output port 1440. The RF input/output port 1410 is communicatively connected to at least one antenna 1450. In examples where the transceiver 1400 is used to implement a verifier component 401 or a prover component 402, the at least one antenna optionally includes omnidirectional antennas such as dipoles or folded dipoles.

The RF input/output port 1410 is configured to transmit and receive radio signals. The processor 1420 is coupled to non-volatile memory 1430. Non-volatile memory 1430 stores computer readable instructions that, when executed by the processor 1420, cause the processor 1420 to execute program steps that implement the functionality of a verifier component 401, a prover component 402, or a helper component 403 as discussed in the methods described herein.

In examples where a control output port 1440 is present, the processor 1420 is coupled to the control output port 1440. The control output port 1440 is configured to provide an indication of whether access to, or functionality of, a resource is to be unlocked. In a further example, the control output port 1440 transmits a signal, which causes access to a vehicle to be unlocked. Optionally, the control output port 1440 is configured to unlock access to the vehicle.

In another example the at least one antenna 1450 and the RF input/output port 1410 are configured to receive and/or transmit radio signals at predetermined frequency. In a further example the predetermined frequency is 900 MHz or 2.4 GHz. Whilst in the example discussed above the at least one antenna 1450 is shown to be situated outside of, but connected to, the transceiver 1400 it will be appreciated that in other examples the at least one antenna 1450 is situated within the transceiver 1400.

Although in the examples above, the method is described in relation to unlocking access and/or functionality of a car, it will be appreciated that other use cases are possible. In another example, the techniques described above are used to facilitate access to a room in a building, where access to the room is controlled by a door with a controllable lock.

Figure 15:
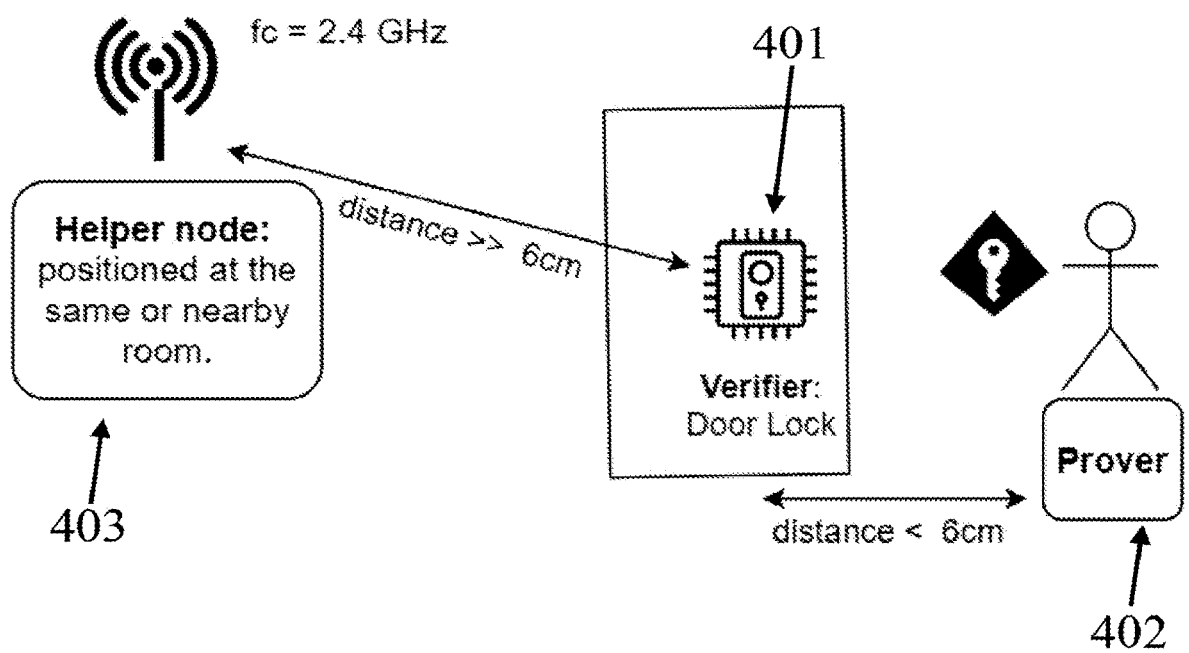
FIG. 15 shows a second use-case of a keyless entry system according to an example.

FIG. 15 shows a second use-case of a keyless entry system according to an example. In particular, FIG. 15 shows a verifier component 401 in a door. The door comprising a controllable lock that controls access to a room. A helper component 403 is positioned in the same room or a nearby room. A prover component 402 is, for example, implemented by a key fob carried by a person. As the person approaches the door, the methods described above are implemented and the verifier component 401 causes the door to be unlocked in response to a valid prover being presented by the person, thereby granting access to the resource. In FIG. 15, a frequency of 2.4 GHz is used by the helper node 403 to transmit the signal. In this case, the helper node is positioned much greater than 6 cm from the verifier component 401 and the prover component 402 will experience a similar channel to the helper node 403 as the verifier component 401 (and therefore pass the "similarity check"), when the prover component 402 is located less than 6 cm from the verifier component 401.

Advantageously a wideband communication channel is not required to implement the above-described methods. In contrast to time-based keyless entry protocols (which generally do require a wideband communication channel), the methods described above can be applied in narrowband systems without compromising security. Furthermore using a narrowband systems facilitates a simpler hardware implementation. Although a narrowband system can be used to implement the above methods, in other examples a wideband communication system is used, advantageously this increases the rate of obtaining the link signature/channel observation. Furthermore, the methods described above do not require half-duplex communication links between the prover and the verifier (unlike previous approaches). As a result, the methods described herein are flexible in that they can be applied with both half-duplex and full-duplex communication links.

Advantageously, at each request for authentication the verifier component challenges the prover component by providing a nonce. As a result, known cryptographic attacks such as chosen-plain text attack, existential forgery, and brute force attacks are hard to realize. Consequently, the methods described above are secure.

Advantageously, unlike Distance Bounding (DB) techniques, the validation of a key-fob is not a proximity measurement based on a time measurement. Instead, the techniques described herein use correlation between link signatures for the validation of a key-fob. As a result, the methods described herein do not require specialist hardware that is capable of making extremely accurate timing measurements at the reader and the key-fob.

Advantageously, different channel quantization methods can be supported by the verifier and prover leading to enhanced security, flexibility and potential for upgrades.

Furthermore, the techniques described herein are also robust against relay attacks and replay attacks. In the case of a typical relay attack (i.e. not the sophisticated relay attack discussed above), a first relay station that is located proximate to the verifier component receives a similar signal as the verifier component (and so could generate a similar channel observation). However, this received signal is then relayed to a second relay station and transmitted by the second relay station to the key fob. In this case, the signal received at the key fob is different to the signal received at the first relay station since the effect of the channel between the second relay station and the key fob changes the transmitted signal. Consequently, in this case, the second channel observation made by a legitimate key fob will not be similar to the first channel observation and the "similarity check" will fail.

A more advanced relay attack (but less advanced than the sophisticated relay attack discussed above) could involve a first relay station making the channel observation. In this case, the similarity test would pass, since the verifier component (making the first channel observation) and the first relay station (making the second channel observation) both experience similar channels to the helper component. However, the key fob (in communication with the second relay station) is still required to generate the hash for use in the process because only the key fob has access to the cryptographic key. In this case, the key fob will generate a hash based on a channel observation between the key fob and the second relay station that is very unlikely to be the same as the first/second channel observation. Consequently, the hash which gets communicated from the key fob, via the relay stations to the verifier component will not pass the "legitimacy test".

Figure 16:
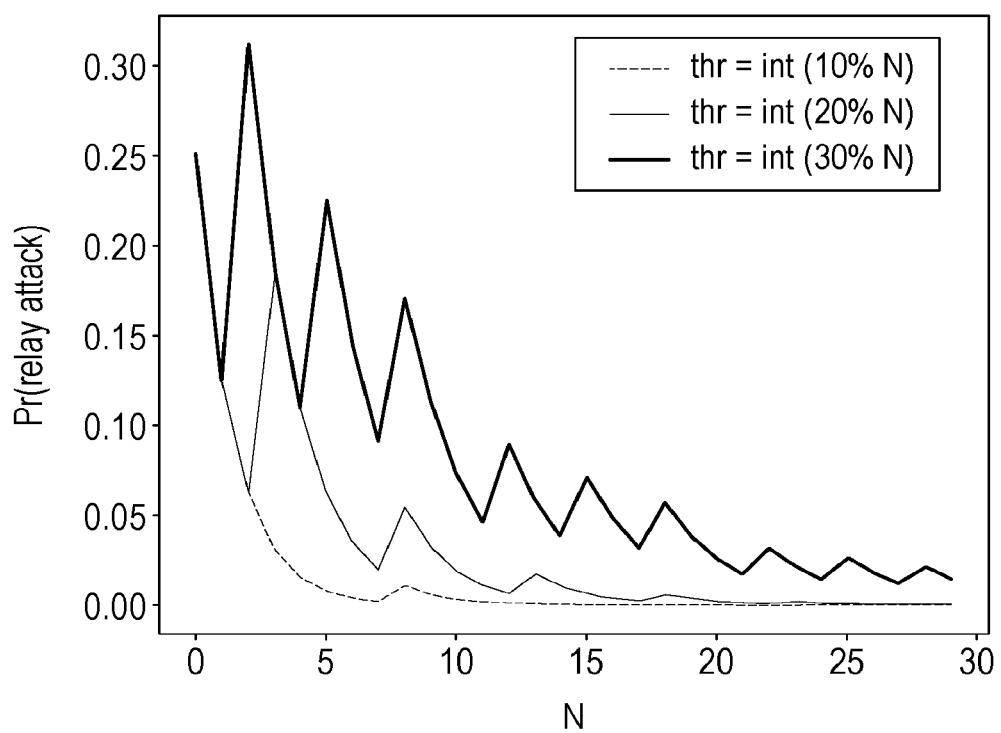
FIG. 16 shows the probability of an advanced relay attack being successful as a function of link signature according to an example.

FIG. 16 shows the probability of an advanced relay attack being successful as a function of link signature according to an example. In particular, FIG. 16 shows the probability of the relay attack being successful as function of link signature length N, where N is the number of bits that is used for the link signature/channel observation. In FIG. 16, the similarity metric used by the verifier component is the Hamming distance (i.e. the number of mismatched bits in the sequence). FIG. 16 shows a number of different curves, each associated with a different threshold for passing the similarity test (e.g. when less than 10% of the link signature bits are different, when less than 20% of the link signature bits are different and when less than 30% of the link signature bits are different). FIG. 16 shows that the probability of an advanced relay attack working is low once the number of bits used for the channel observation gets larger (since at low values of N, random guessing can be used). The discontinuities in the graph arise because of the integer values of the threshold. If the percentage threshold for the number of mismatches is $\varepsilon$, then the maximum allowed number of mismatches is the integer part of the product $N\varepsilon$.

The methods described above are also robust against replay attacks. A naïve relay attack whereby an attacker simply replays an overheard message sent by a legitimate used will fail with high probability since at the time of replay the old link signature which is included in the message transmitted by the attacker will have expired in the sense that it will no-longer be the current channel being observed by the verifier component. A replay attack is also even less likely to be successful when random beam steering is used since the beam steering will result in different channel signatures at different times. A yet more advanced replay attack could involve recording a large number of hash functions, nonces and channel observations for example in a look up table and selecting the appropriate set of data in response to making a channel observation as part of the validation process. However, the average number of records/queries required for such an attack to be successful increases exponentially with the size of the hash function, making this attack difficult in reality.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for controlling access to a resource, the method performed by a system comprising a first component, a second component and a third component, wherein:
the first component comprises a first cryptographic key;
the second component comprises a second cryptographic key; and
the method comprises:
transmitting, by the third component, a signal;
generating, by the first component, a first channel observation;
generating, by the second component, a second channel observation;
generating, by the second component, a first data value based on the second channel observation and the second cryptographic key;
transmitting, by the second component, to the first component, the second channel observation and the first data value;
verifying the second component, by the first component, based on the second channel observation, the first cryptographic key and the first data value; and
allowing access to the resource in response to determining that the second component is: 1) permitted to gain access to the resource; and 2) located proximate to the first component.

2. The method according to claim 1, wherein generating, by the first component, the first channel observation comprises:
determining a received signal strength indicator of a received signal,
sampling the received signal strength indicator to generate a sampled signal; and
quantizing the sampled signal to generate the first channel observation.

3. The method according to claim 1, wherein generating the first data value based on the second channel observation and the second cryptographic key comprises:
applying the second channel observation as an input to a keyed hash function, wherein the keyed hash function uses the second cryptographic key.

4. The method according to claim 1, wherein the method further comprises:
transmitting, by the first component, to the second component, a random number; and wherein:
generating, by the second component, the first data value based on the second channel observation and the second cryptographic key, further comprises:

generating the first data value based on the second channel observation, the second cryptographic key, and the random number; and wherein:
verifying the second component, by the first component, based on the second channel observation, the first cryptographic key and the first data value, further comprises:
generating a second data value based on the second channel observation, the random number and the first cryptographic key; and
determining that the second component is permitted to gain access to the resource in response to determining that the first data value is the same as the second data value.

5. The method according to claim 4, further comprising:
starting a timer at the first component in response to transmitting the random number;
stopping the timer at the first component in response to receiving the second channel observation and the first data value from the second component; and
allowing access to the resource in response to determining that:
a value of the timer is less than a threshold; and
the second component is: 1) permitted to gain access to the resource; and 2) located proximate to the first component.

6. The method according to claim 1, wherein verifying the second component by the first component comprises:
comparing the first channel observation and the second channel observation; and
determining that the second component is located proximate to the first component in response to determining that the first channel observation is similar to the second channel observation.

7. The method according to claim 1, wherein the method further comprises:
transmitting, by the third component, the signal in a first direction; and
transmitting, by the third component, the signal in a second direction.

8. The method according to claim 1, wherein the method further comprises:
initializing, by the first component, an access attempt counter; and
in response to determining that the second component is: 1) not permitted to gain access to the resource and/or 2) not located proximate to the first component:
preventing access to the resource;
incrementing the access attempt counter; and
disabling remote access to the resource in response to determining that the access attempt counter is greater than a threshold.

9. The method of claim 1 wherein the first channel observation and the second channel observation are each 128 bits in length.

10. The method according to claim 1 wherein:
the resource is a car and the method is for controlling access to the car; or
the resource is a building and the method is for controlling access to the building.

11. The method according to claim 1, further comprising transmitting the signal at a frequency of 900 MHz or 2.4 GHz.

12. A system for controlling access to a resource, the system comprising a first component, a second component and a third component, wherein:
the first component comprises a first cryptographic key;

the second component comprises a second cryptographic key; and wherein:

the third component is configured to:
  transmit a signal;

the second component is configured to:
  generate a second channel observation;
  generate a first data value based on the second channel observation and the second cryptographic key; and
  transmit to the first component, the second channel observation and the first data value; and the first component is configured to:
  generate a first channel observation;
  verify the second component based on the second channel observation, the first cryptographic key and the first data value; and
  allow access to the resource in response to determining that the second component is: 1) permitted to gain access to the resource; and 2) located proximate to the first component.

13. The system according to claim 12, wherein the first component is further configured, when generating the first channel observation, to:
  determine a received signal strength indicator of a received signal,
  sample the received signal strength indicator to generate a sampled signal; and
  quantize the sampled signal to generate the first channel observation.

14. The system according to claim 12, wherein the second component is further configured, when generating the first data value based on the second channel observation and the second cryptographic key, to:
  apply the second channel observation as an input to a keyed hash function, wherein the keyed hash function uses the second cryptographic key.

15. The system according to claim 12, wherein:
  the second component is further configured, when generating the first data value based on the second channel observation and the second cryptographic key, to:
    generate the first data value based on the second channel observation, the second cryptographic key, and a random number; and wherein:
  the first component is further configured to:
    transmit the random number to the second component and
    generate a second data value based on the second channel observation, the random number and the first cryptographic key; and
    determine that the second component is permitted to gain access to the resource in response to determining that the first data value is the same as the second data value.

16. The system according to claim 15, wherein the first component is further configured to:
  start a timer in response to transmitting the random number;
  stop the timer in response to receiving the second channel observation and the first data value from the second component; and
  allow access to the resource in response to determining that:
    a value of the timer is less than a threshold; and
    the second component is: 1) permitted to gain access to the resource; and 2) located proximate to the first component.

17. The system according to claim 12, wherein the first component is further configured, when verifying the second component, to:
  compare the first channel observation and the second channel observation; and
  determine that the second component is located proximate to the first component in response to determining that the first channel observation is similar to the second channel observation.

18. The system according to claim 12, wherein the third component is further configured to:
  transmit the signal in a first direction; and
  transmit the signal in a second direction.

19. The system according to claim 12, wherein the first component is further configured to:
  initialize an access attempt counter; and
  in response to determining that the second component is: 1) not permitted to gain access to the resource and/or 2) not located proximate to the first component:
    prevent access to the resource;
    increment the access attempt counter; and
    disable remote access to the resource in response to determining that the access attempt counter is greater than a threshold.

20. The system of claim 12 wherein the first channel observation and the second channel observation are each 128 bits in length.

* * * * *